United States Patent
Nagasaka et al.

(10) Patent No.: US 11,113,036 B2
(45) Date of Patent: Sep. 7, 2021

(54) PROGRAMMING DEVICE AND RECORDING MEDIUM, AND PROGRAMMING METHOD

(71) Applicant: CASIO COMPUTER CO., LTD., Tokyo (JP)

(72) Inventors: Tomoaki Nagasaka, Koganei (JP); Shogo Hashimoto, Kokubunji (JP); Tomoharu Yamaguchi, Kodaira (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 97 days.

(21) Appl. No.: 16/499,229

(22) PCT Filed: Feb. 15, 2018

(86) PCT No.: PCT/JP2018/006327
§ 371 (c)(1),
(2) Date: Sep. 27, 2019

(87) PCT Pub. No.: WO2018/180051
PCT Pub. Date: Oct. 4, 2018

(65) Prior Publication Data
US 2021/0109719 A1 Apr. 15, 2021

(30) Foreign Application Priority Data
Mar. 27, 2017 (JP) .............................. JP2017-060808

(51) Int. Cl.
*G06F 8/30* (2018.01)
*G06F 8/34* (2018.01)
(Continued)

(52) U.S. Cl.
CPC .................. *G06F 8/34* (2013.01); *G06F 8/20* (2013.01); *G06F 8/35* (2013.01); *G06F 8/75* (2013.01);
(Continued)

(58) Field of Classification Search
CPC ....... G06F 8/34; G05B 19/00; G05B 19/0426; G09B 19/00; G09B 19/0053; G09B 1/00; G09B 1/325
See application file for complete search history.

(56) References Cited

U.S. PATENT DOCUMENTS

2005/0026537 A1 2/2005 Hsieh et al.
2008/0213735 A1* 9/2008 Shorr ..................... A63H 3/04
434/178
(Continued)

FOREIGN PATENT DOCUMENTS

JP H05204620 A 8/1993
JP 2015091282 A 5/2015
JP 2017506781 A 3/2017

OTHER PUBLICATIONS

Christian Bjorge Thoresen and Ulrik Hanke, Numerical Simulatio of Mutual Capacitance Touch Screens for ungrounded Objects, IEEE, 2017, retrieved online on May 22, 2021, pp. 5143-5152. Retrieved from the Internet: <URL: https://ieeexplore.IEEE.org/stamp/stamp.jsp?tp=&arnumber=7962288>. (Year: 2017).*
(Continued)

*Primary Examiner* — Hanh Thi-Minh Bui
(74) *Attorney, Agent, or Firm* — Holtz, Holtz & Volek PC

(57) ABSTRACT

A programming device including a planar shape indication section which receives at least one first user operation for indicating a planar shape by specifying two or more portions among a plurality of portions arranged at different positions in a planar direction; a height reception section which receives at least one second user operation for indicating a height that is a position in a direction intersecting with the plane or a displacement amount of the height in association with a portion of any of the two or more portions; and a control section which generates a command list for moving a control target section along a three-dimensional shape indicated by the planar shape indication section and the height reception section.

9 Claims, 18 Drawing Sheets

(51) Int. Cl.
  *G06F 8/20* (2018.01)
  *G06F 8/35* (2018.01)
  *G06F 8/75* (2018.01)
  *G09B 19/00* (2006.01)
  *G09B 1/00* (2006.01)
  *G09B 1/32* (2006.01)

(52) U.S. Cl.
  CPC ............... *G09B 1/00* (2013.01); *G09B 1/325* (2013.01); *G09B 19/00* (2013.01); *G09B 19/0053* (2013.01)

(56) References Cited

U.S. PATENT DOCUMENTS

| | | |
|---|---|---|
| 2015/0095883 A1 | 4/2015 | Shi |
| 2015/0310238 A1 | 10/2015 | Shi et al. |
| 2015/0360366 A1 | 12/2015 | Gupta et al. |
| 2015/0364060 A1 | 12/2015 | Gupta et al. |
| 2016/0001180 A1 | 1/2016 | Shi |
| 2016/0379519 A1 | 12/2016 | Gupta et al. |
| 2017/0036344 A1 | 2/2017 | Gupta et al. |
| 2017/0236446 A1 | 8/2017 | Gupta et al. |
| 2017/0297195 A1 | 10/2017 | Gupta et al. |
| 2019/0108771 A1 | 4/2019 | Gupta et al. |

OTHER PUBLICATIONS

"Cubetto: Robot for Teaching Coding and Programming to Children", [online], 2016, Primo Toys, [retrieved on Nov. 22, 2016], Internet <URL:https://www.primotoys.com/ja/>.

International Search Report (ISR) and Written Opinion dated May 22, 2018 issued in International Application No. PCT/JP2018/006327.

Parrot RollinqSpider を自動航行させるアプリがあった. JIZOMAEのブログ , Apr. 16, 2015, [online], retrieved on: May 7, 2018, URL, http://jizomae.blog.jp/archives/27063026.html.

* cited by examiner

FIG. 5
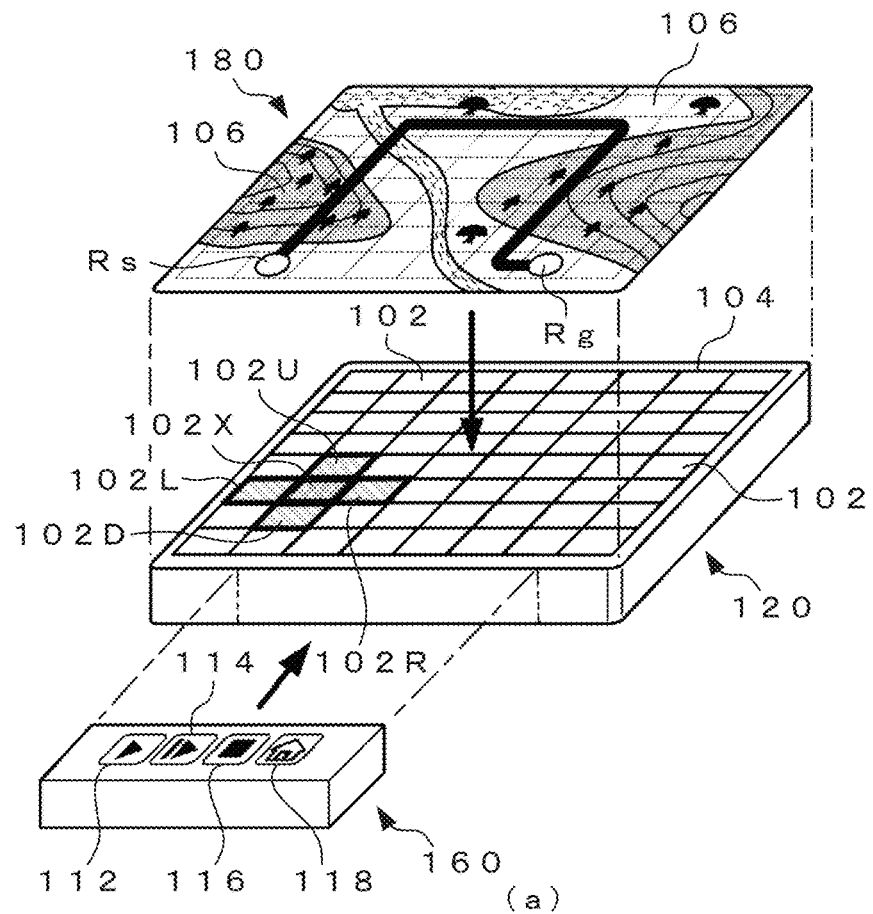
(a)
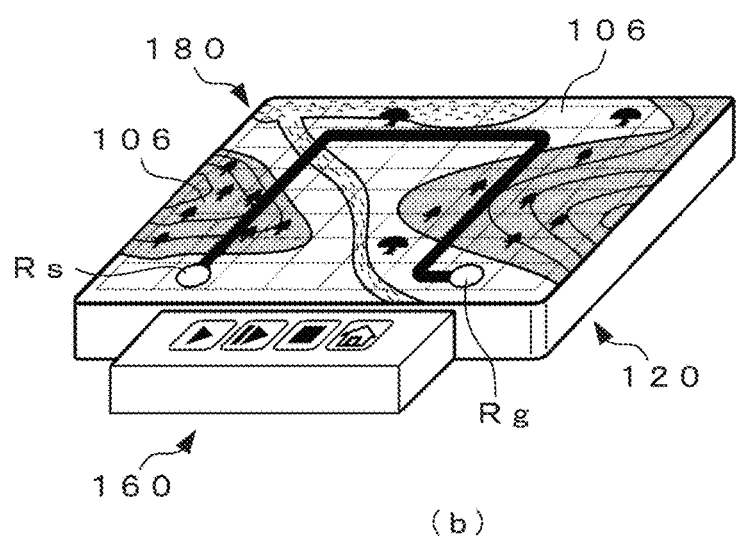
(b)

FIG. 6
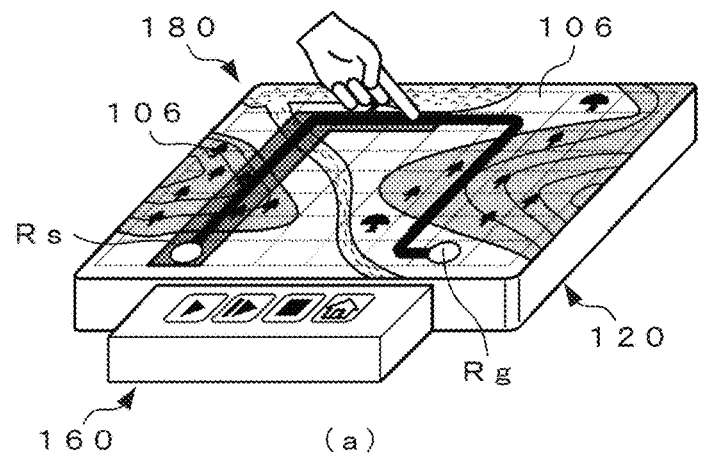
(a)
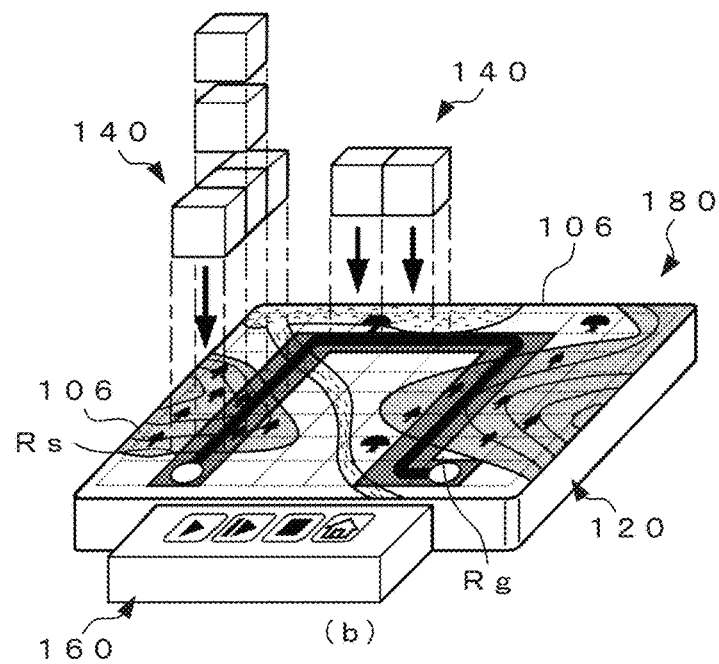
(b)
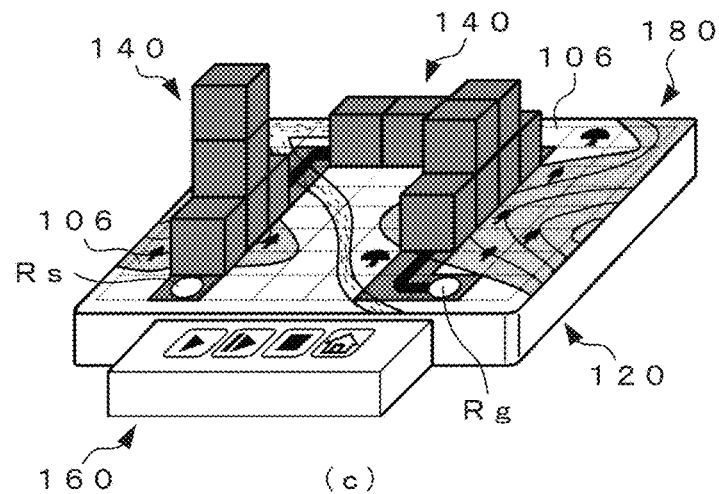
(c)

FIG. 8
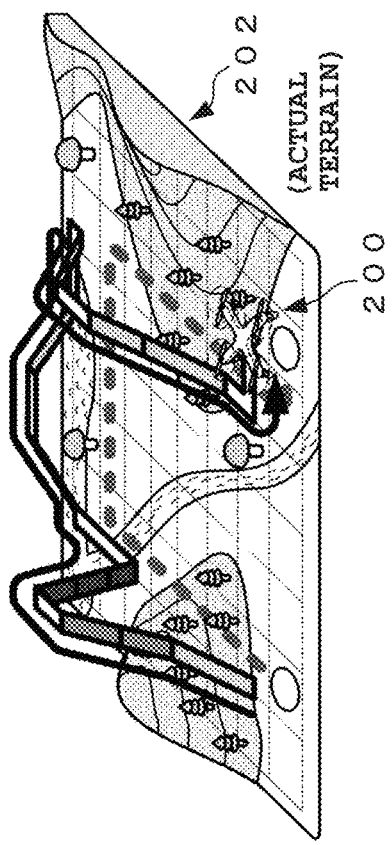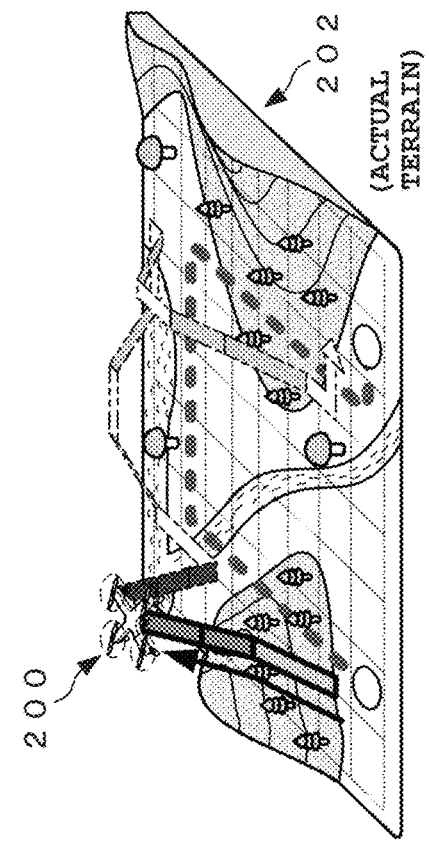
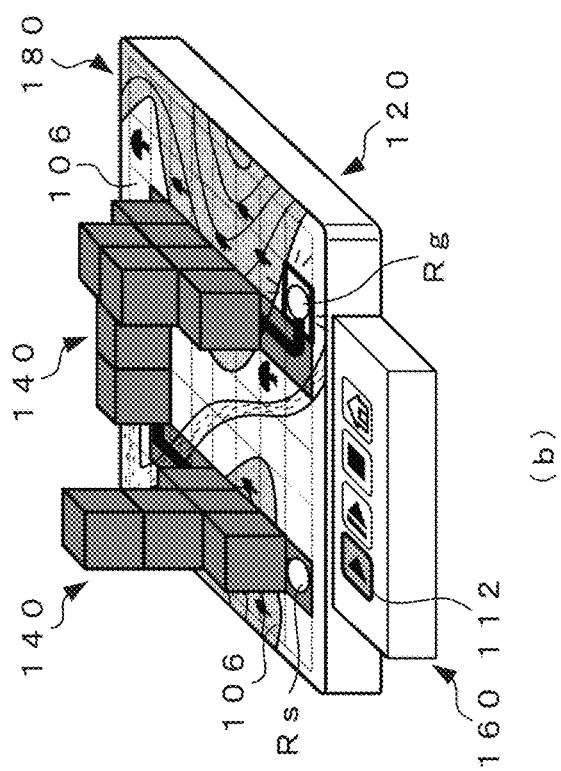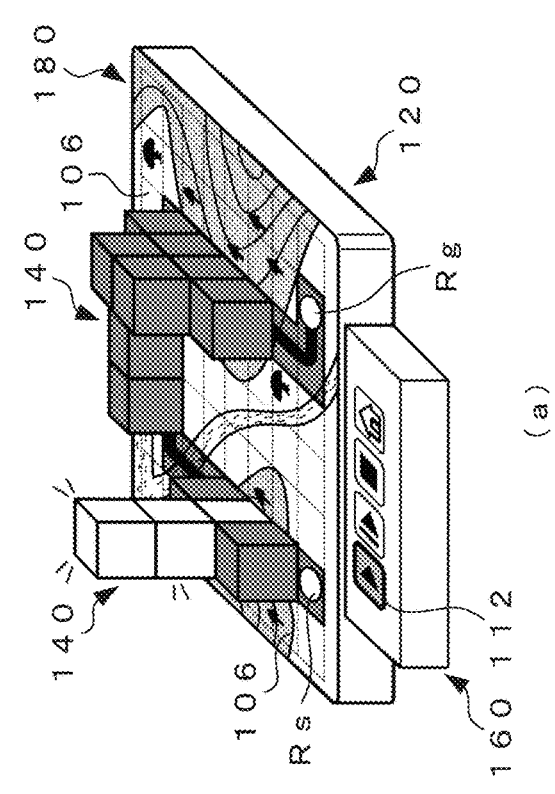

FIG. 11
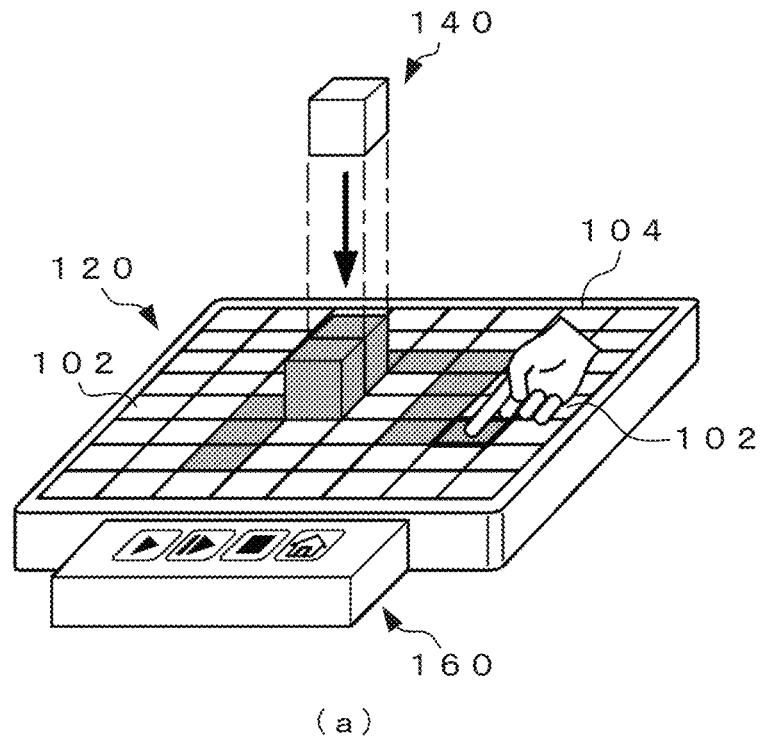
(a)
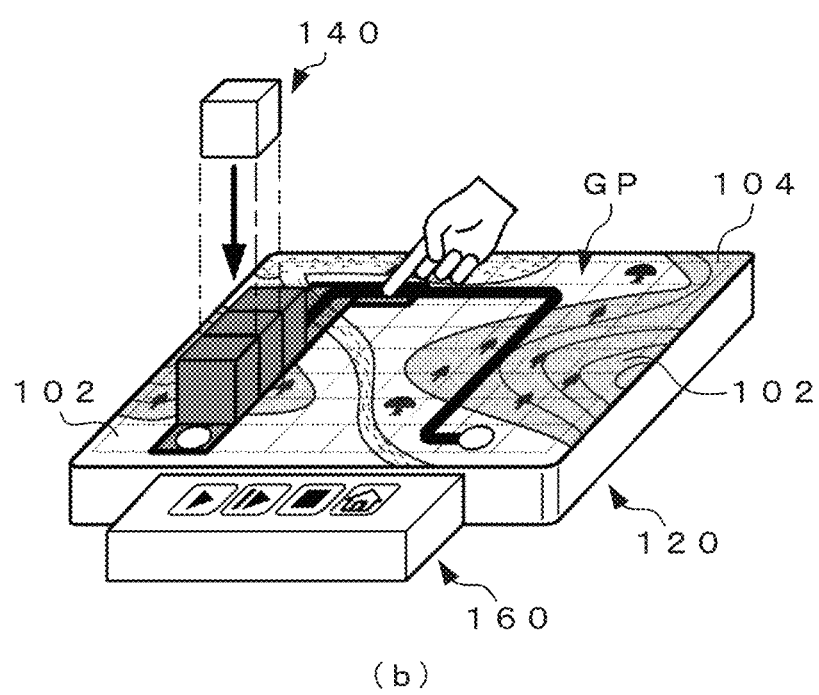
(b)

FIG. 12
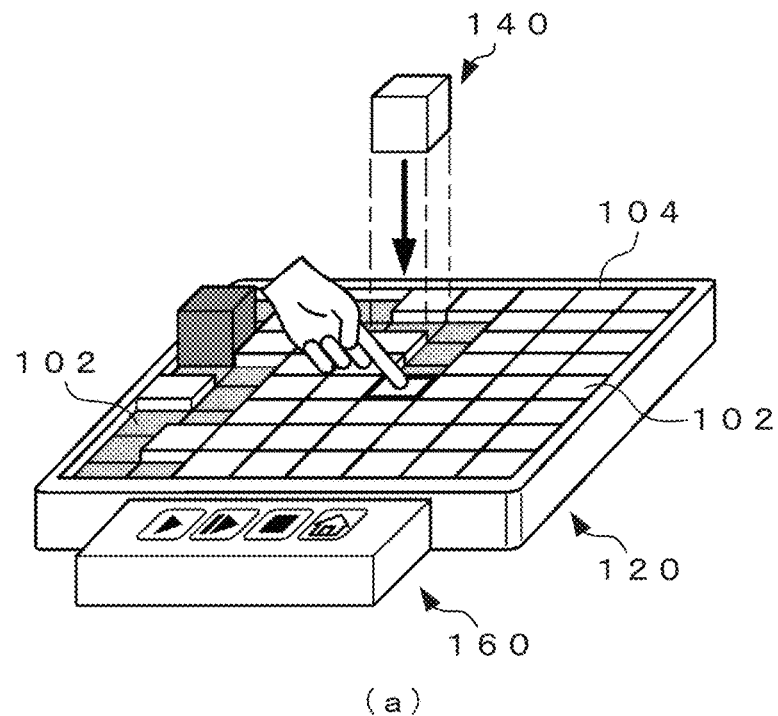
(a)
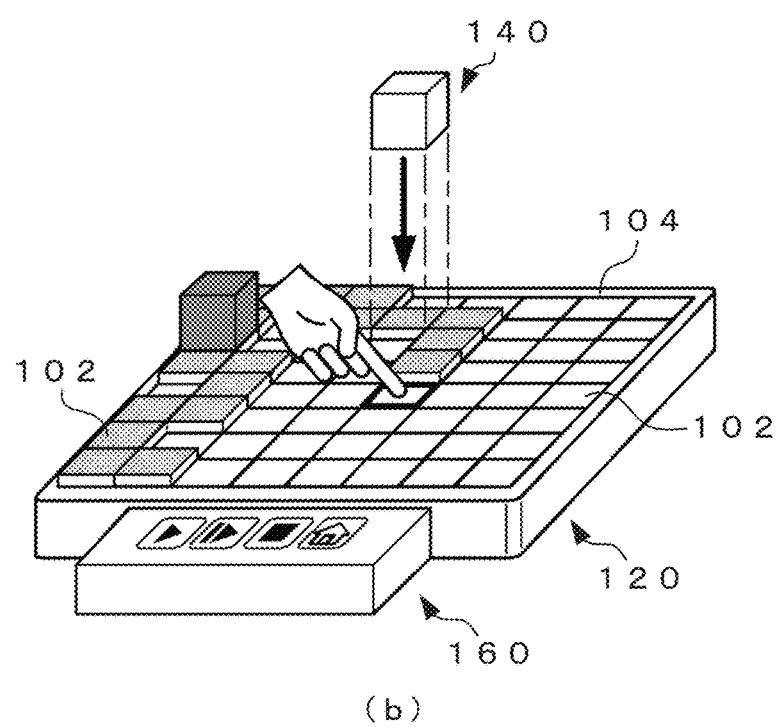
(b)

FIG. 13
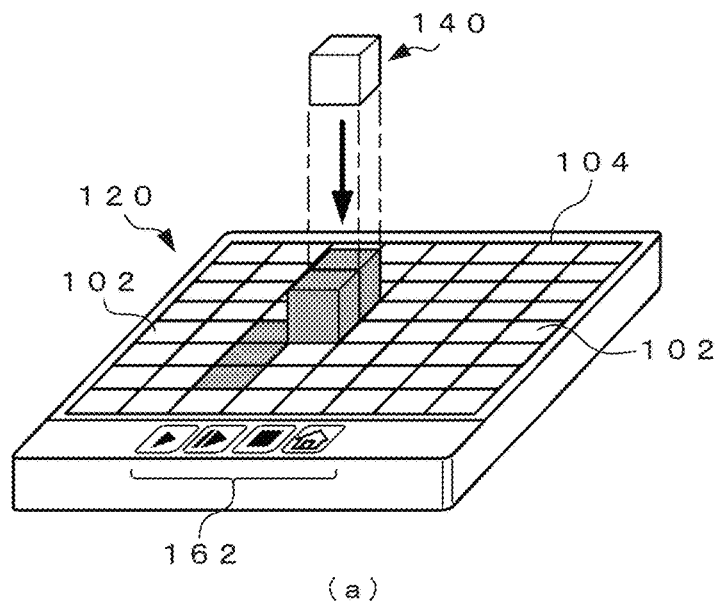
(a)
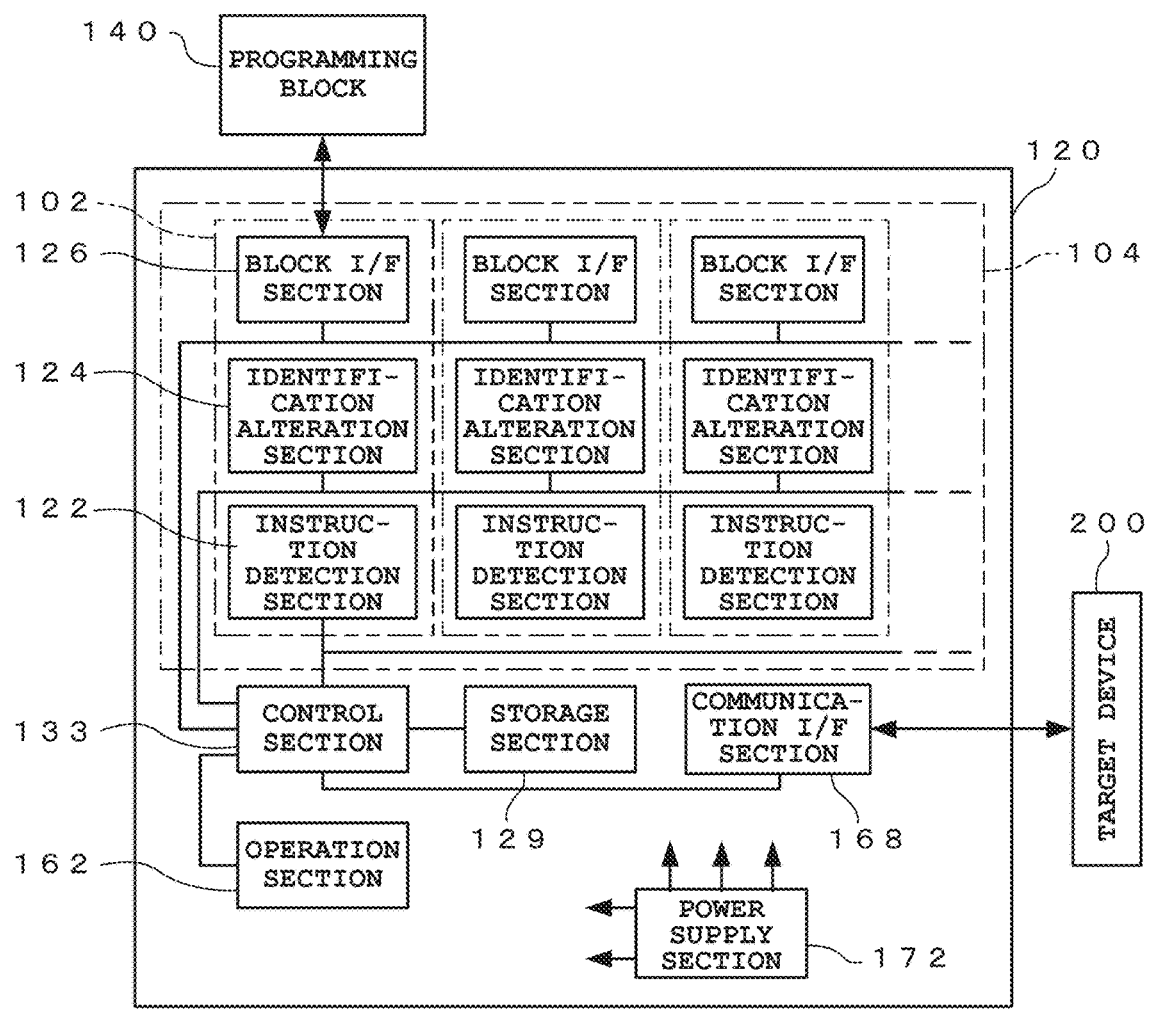
(b)

FIG. 17
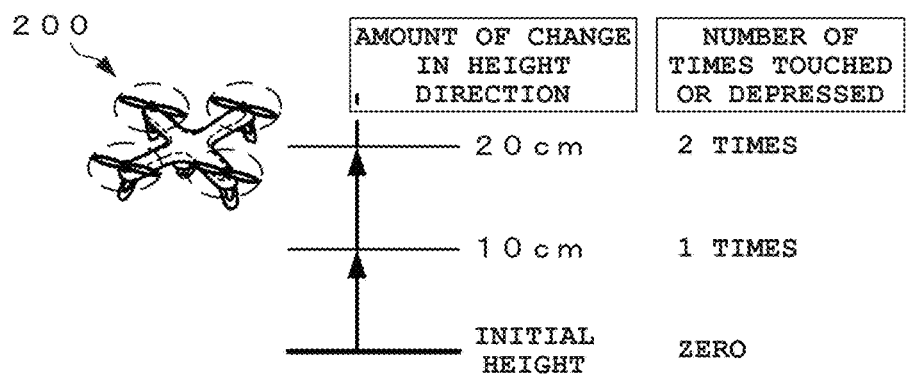
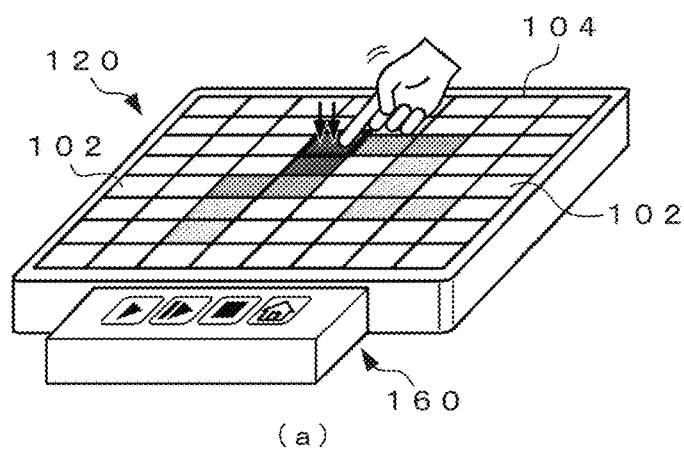
(a)
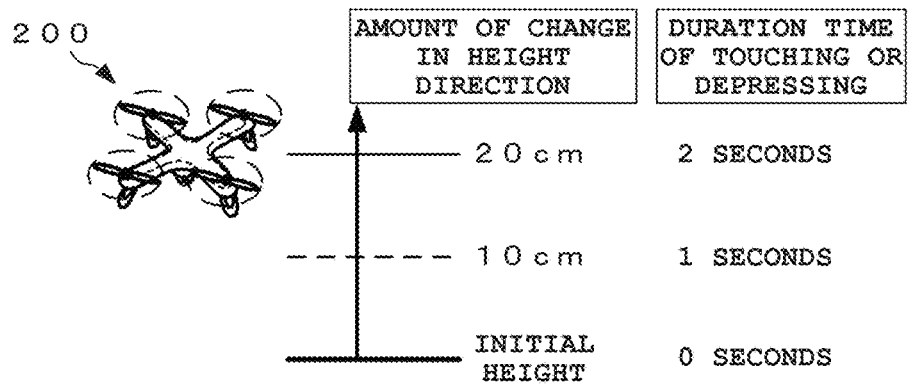
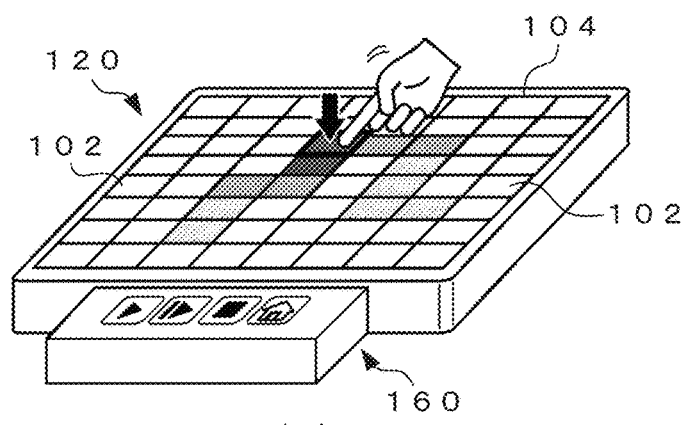
(b)

FIG. 18
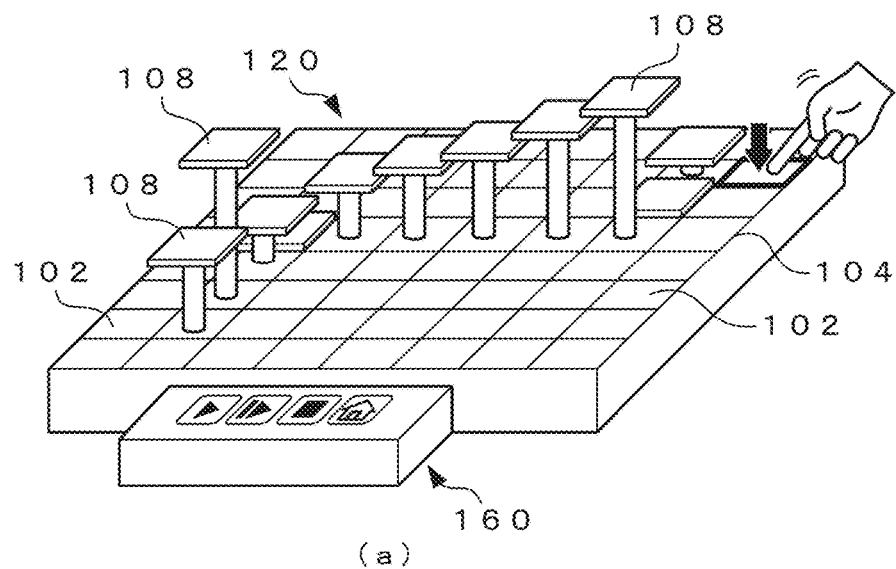
(a)
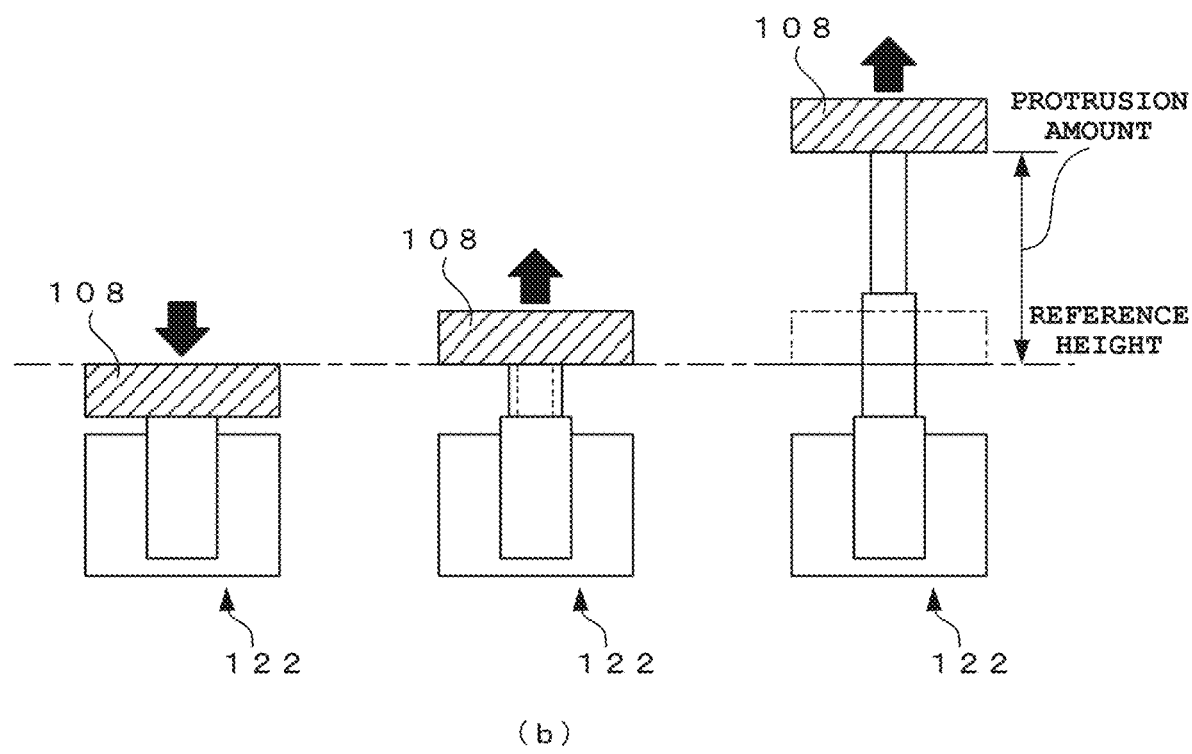
(b)

PROGRAMMING DEVICE AND RECORDING MEDIUM, AND PROGRAMMING METHOD

CROSS REFERENCE TO RELATED APPLICATIONS

This is a U.S. National Phase application of International Application No. PCT/JP2018/006327, filed Feb. 15, 2018, which is based on and claims priority from Japanese Patent Application No. 2017-060808, filed Mar. 27, 2017, the entire contents of both of which are incorporated herein by reference.

TECHNICAL FIELD

The present invention relates to a programming device and a storage medium, and a programming method.

BACKGROUND ART

Conventionally, the importance of program development technology had been brought up along with the popularization of information and communication devices such as computers and mobile terminals and the development of control technology for various devices including them. Accordingly, in recent years the importance of programming education to children from an early age has been internationally recognized, so that countries which adopt programming as a compulsory subject in the curriculum of compulsory education are increasing in number. In Japan as well, programming education has been incorporated into political policy. Therefore, it is expected that in the future there will be increasing interest in programming education among younger age groups.

On the background of the increasing interest in programming education, various programming education tools have been developed. For example, Patent Document 1 discloses a technique in which a program is created by a user directly holding physical blocks (objects) and actually moving them so as to one-dimensionally or two-dimensionally connect them, and the operation of an execution apparatus is controlled based on the program. Further, Non-Patent Document 1 also discloses a technique in which a user directly holds each physical block (object) and actually moves it on a predetermined board so as to sequentially mount them, whereby a program is created to control the operation of a traveling robot.

With these disclosed techniques, the configuration and execution status of a program can be intuitively learned by the traveling robot or the character sequentially performing functions set in connected or mounted blocks. Note that, in the present specification, programming by directly moving an object as shown in Patent Document 1 or Non-Patent Document 1 is referred to as tangible programming. On the other hand, programming by touching and moving virtual blocks, that is, virtual icons displayed on the screen of an electronic display such as a liquid crystal display as shown in Non-Patent Document 2 is referred to as visual programming. Also, in the present specification, "tangible" represents a state where an object is substantial and can be touched and felt in real space. Here, although an electronic display itself, such as a liquid crystal display itself, is tangible, operating an icon electronically displayed on such a display by touching its display screen is not a tangible operation.

PRIOR ART DOCUMENT

Patent Document

Patent Document 1: JP 05-204620

Non-Patent Document

Non-Patent Document 1: "Cubetto: ROBOT FOR TEACHING CODING AND PROGRAMMING TO CHILDREN", [online], 2016, Primo Toys, [retrieved on Nov. 22, 2016], Internet <URL: https://www.primotoys.com/ja/>

SUMMARY OF INVENTION

Problem to be Solved by the Invention

It is considered in general that, in programming education to younger children such as infants, a higher learning effect can be acquired by tangible programming, that is, programming by actually touching an object in real space and performing an operation of moving and deforming the object, in terms of intellectual development.

However, although the techniques described in Patent Document 1 and Non-Patent Document 1 are tangible programming, since their methods are to perform programming by connecting blocks having set functions by predetermined joint sections or sequentially mounting them on a predetermined board, the shape or arrangement of connected or mounted blocks as a whole and the movement direction of the execution apparatus or the travelling robot that is actually moved have no relation to each other. Therefore, younger children learning programming with these techniques cannot easily and intuitively grasp or understand a relation between the contents of their operations and the movements of the execution apparatus, and therefore may not sufficiently acquire effects of learning programming.

In addition, flyable objects like drones are becoming prevalent in recent years, and advances in control technology related to the movement of an object in three-dimensional space, such as the movement of an object (a character) in a virtual space by application software of a mobile terminal such as a smartphone or a game machine, are significant. Therefore, the importance of ability to grasp and understand not only the movement of an object in three-dimensional space but also the movement of an object in pseudo three-dimensions has also been pointed out. In the pseudo three-dimensions, in addition to a movement in two-dimensional space, a movement based on a parameter change related to another dimension is taken as a third dimensional movement (Hereinafter, they are collectively referred to as "three-dimensional object movement" for convenience).

As described above, as educational tools for teaching programming to younger children, the technique using tangible programming is conventionally known. However, they can hardly be said to be techniques by which children can acquire sufficient effects of learning programming. That is, no programming educational tool is known in which a user easily understands a relation between a programming operation by tangible programming and a three-dimensional object movement of a control target section based on a program created by this operation.

Thus, in view of the above-described problems, an object of the present invention is to provide a programming device, a storage medium and a programming method whereby a user can easily understand the relation between a programming operation and a three-dimensional object movement of a control target section based on a program created by this operation.

Means for Solving the Problem

A programming device of the present invention comprises: a planar shape indication section which receives at least one first user operation for indicating a planar shape by specifying two or more portions among a plurality of portions arranged at different positions in a planar direction; a height reception section which receives at least one second user operation for indicating a height that is a position in a direction intersecting with the plane or a displacement amount of the height in association with a portion of any of the two or more portions; and a control section which generates a command list for moving a control target section along a three-dimensional shape indicated by the planar shape indication section and the height reception section.

A programming method of the present invention which is executed by a programming device including a planar shape indication section, a height reception section and a control section, comprises: causing the planar shape indication section of the programming device to receive at least one first user operation for indicating a planar shape by specifying two or more portions among a plurality of portions arranged at different positions in a planar direction; causing the height reception section of the programming device to receive at least one second user operation for indicating a height that is a position in a direction intersecting with the plane or a displacement amount of the height in association with a portion of any of the two or more portions; and causing the control section of programming device to generate a command list for moving a control target section along a three-dimensional shape indicated by the planar shape indication section and the height reception section.

A non-transitory computer readable storage medium of the present invention having a program stored thereon that is executable by a computer of a programming device including a planar shape indication section, a height reception section and a control section to actualize functions comprising: processing for causing the planar shape indication section of the programming device to receive at least one first user operation for indicating a planar shape by specifying two or more portions among a plurality of portions arranged at different positions in a planar direction; processing for causing the height reception section of the programming device to receive at least one second user operation for indicating a height that is a position in a direction intersecting with the plane or a displacement amount of the height in association with a portion of any of the two or more portions; and processing for causing the control section of the programming device to generate a command list for moving a control target section along a three-dimensional shape indicated by the planar shape indication section and the height reception section.

BRIEF DESCRIPTION OF DRAWINGS

FIG. 5 is a first schematic diagram for describing programming operation processing applied in the present embodiment;

FIG. 6 is a second schematic diagram for describing the programming operation processing applied in the present embodiment;

FIG. 8 is a second schematic diagram for describing the program generation and the execution processing (batch processing) applied in the present embodiment;

FIG. 11 is a first schematic diagram showing a configuration example of the programming educational device (programming device) according to the present embodiment which does not have a guide sheet;

FIG. 12 is a second schematic diagram showing a configuration example of the programming educational device (programming device) according to the present embodiment which does not include any guide sheet;

FIG. 13 is a schematic diagram showing a configuration example where a programming board and a core unit have been integrally formed in the programming educational device (programming device) according to the present embodiment;

FIG. 17 is a schematic diagram showing a second embodiment of the programming educational device where a program control device according to the present invention has been applied;

FIG. 18 is a schematic diagram showing a third embodiment of the programming educational device where the program control device according to the present invention has been applied.

DESCRIPTION OF EMBODIMENTS

A programming device, a control program therefor, and a programming method according to the present invention will hereinafter be described in detail with reference to preferred embodiments. Here, for simplification of description, a case is described that creates programs for controlling the operating state of a target device that can be three-dimensionally moved by use of a programming educational device to which the programming device according to the present invention has been applied.

First Embodiment (Programming Educational Device)

Figure 1:
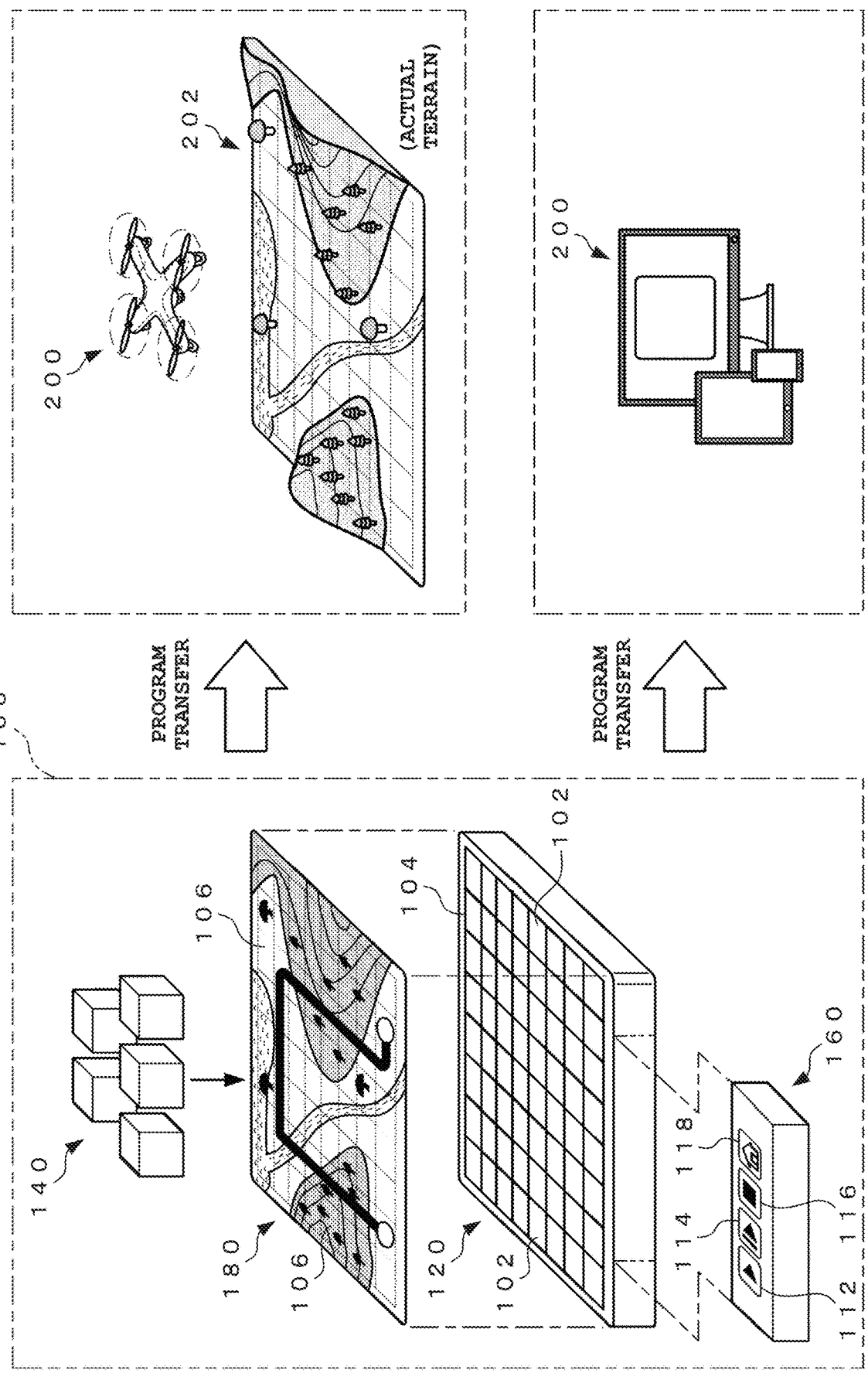
FIG. 1 is a schematic diagram showing an embodiment of a programming educational device to which the programming device according to the present invention has been applied.
Figure 2:
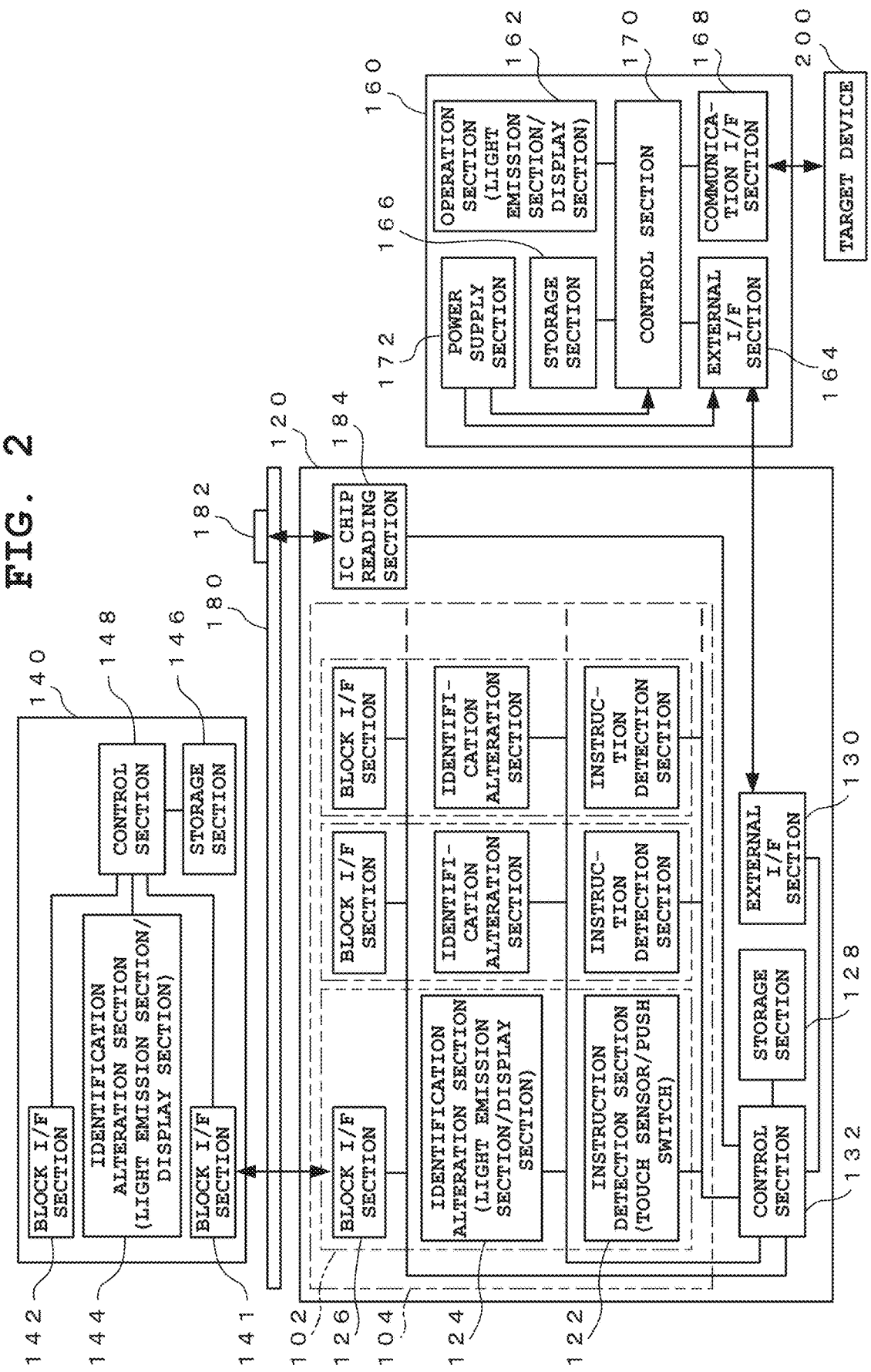
FIG. 2 is a function block diagram showing a structural example of the programming educational device according to the present embodiment.
Figure 3:
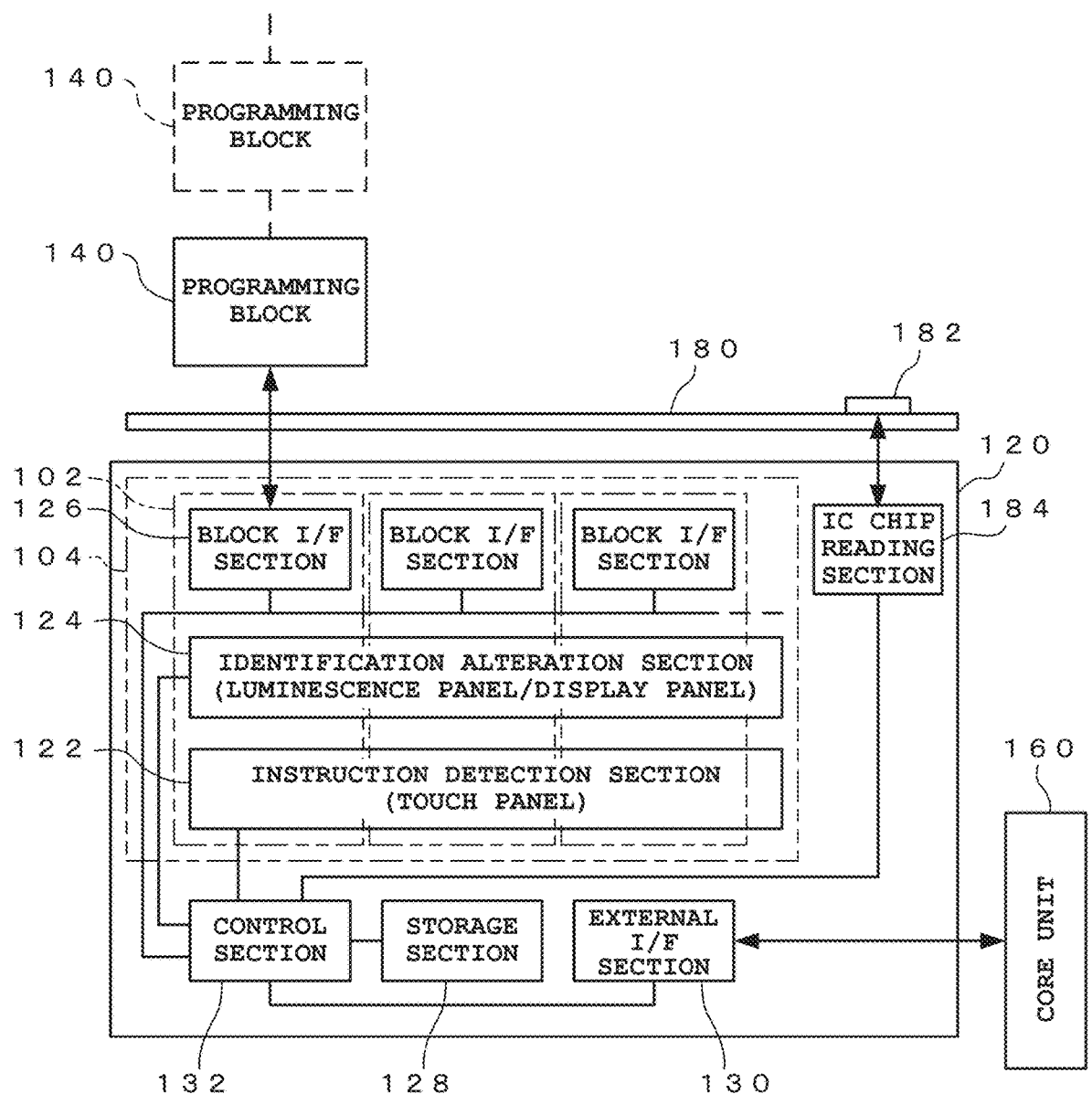
FIG. 3 is a function block diagram showing another structural example of the programming educational device according to the present embodiment.

FIG. 1 is a schematic diagram showing an embodiment of a programming educational device to which the programming device according to the present invention has been applied. FIG. 2 is a function block diagram showing a structural example of the programming educational device according to the present embodiment, and FIG. 3 is a function block diagram showing another structural example of the programming educational device according to the present embodiment.

The programming educational device according to the present embodiment mainly includes, for example, a program control device 100 and a target device 200, as shown in FIG. 1. The program control device 100 receives input operations performed by a user who is a programming education target, acquires information according to the received input operations, and generates programs for controlling the operating state of the target device 200. The target device 200 is a tangible or intangible movable object, and its operating state is controlled by the programs transferred from the program control device 100. Hereinafter, the program control device 100 and the target device (control target section) 200 are explained in detail.

(Program Control Device)

The Program control device 100 includes, for example, a programming board (planar shape indication section) 120, programming blocks (height indication section, function setting section and parameter value indication section) 140, a core unit (command generation section) 160, and a programming guide sheet (hereinafter referred to as "guide sheet") 180, all of which are tangible, as shown in FIG. 1.

(Programming Board 120)

The programming board 120 is a tangible object that can be directly and physically touched in real space and has, for example, a substantially plate-like shape whose one side (upper surface) is provided with a programming area 104 where a plurality of tangible areas 102 having the same planar shape have been two-dimensionally arranged adjacent to one another in a matrix direction, as shown in FIG. 1. This programming area 104 functions as an input device that acquires instruction information given by a later-described tangible input operation by the user, and each area 102 of this programming area 104 corresponds to a position in a two-dimensional plane (horizontal plane in the present embodiment) of an absolute coordinate system where the later-described target device 200 is moved. Here, for example, each area 102 has a rectangular planar shape such as a square or a rectangle, and these areas 102 are arranged in a lattice shape, as shown FIG. 1. Note that the planar shape of each area 102 may be a polygonal shape such as an octagon or a circular shape instead of the rectangular shape.

Specifically, the programming board 120 includes, for example, instruction detection sections (height reception section, function reception section and parameter value reception section) 122, identification alteration sections 124, block interface sections (hereinafter referred to as "block I/F sections", height reception section, function reception section and parameter value reception section) 126, a storage section 128, an external interface section (hereinafter referred to as "external I/F section") 130, and a control section 132, as shown in FIG. 2.

Each instruction detection section 122 detects the user's instruction performed on an area 102 of the programming area 104. Specifically, the instruction detection sections 122 have, for example, touch sensors or mechanical switches such as push switches individually provided corresponding to each area 102 of the programming area 104, as shown in FIG. 2. When a state is detected in which the user's finger or the like has come in contact with an area 102 via its touch sensor or has pressed an area 102 via its push switch, the corresponding instruction detection section 122 identifies this area (indicated area) on the programming area 104. Information (hereinafter referred to as "indicated position information") regarding the position of each indicated area acquired by the instruction detection sections 122 is stored in order in a storage area of the storage section 128 described later. Here, each touch sensor to be applied for the instruction detection sections 122 may be a capacitive touch sensor or may be a pressure-sensitive touch sensor. Also, each push switch to be applied for the instruction detection sections 122 should preferably have a mechanism where an ON state and an OFF state are switched every time the user performs a depression operation, and the upper surface of each push switch returns to be at the same height (referred to as "reference height" for convenience of explanation) as that of the programming area 104 after it is pressed (That is, the upper surface of each push switch always returns to be at the reference height).

In FIG. 2, the structure has been shown in which touch sensors or push switches have been individually provided corresponding to each area 102 of the programming area 104. However, the present invention is not limited thereto. For example, a structure such as that shown in FIG. 3 may be adopted in which a common touch panel is provided on the entire programming area 104 as an instruction detection section 122. In this structure, the instruction detection section 122 detects a state where the user's finger or the like has come in contact with a position corresponding to an area 102 of the touch panel, and thereby identifies the position of the indicated area 102 in the programming area 104. In this structure as well, the touch panel may be a capacitive touch panel or may be a pressure-sensitive touch panel. With this structure, the resolution of the touch panel of the instruction detection section 122 is improved and each indicated area 102 can be more finely detected. Accordingly, not only a straight route (or a route in an orthogonal direction) but also a route having a smooth curve can be set as a movement route of the target device 200. In the structure shown in FIG. 3, a luminescent panel or a display panel which is shared in the entire programming area 104 is provided as an identification alteration section 124. However, in this structure where a touch panel is provided as an instruction detection section 122, identification alteration sections 124 individually corresponding to each area 102 may be provided.

Each identification alteration section 124 alters an area (indicated area) indicated by the user to be visually distinguishable from areas which have not been indicated. Specifically, the identification alteration sections 124 have, for example, light emission sections or display sections individually provided corresponding to each area 102 of the programming area 104, as shown in FIG. 2. For example, as the light emission sections to be applied in the identification alteration sections 124, Light Emitting Diodes (LEDs) may be used. Also, as the display sections, display means using a liquid crystal or an organic EL element may be used. In a programming operation by the use of the programming board 120, each identification alteration section 124 causes the light emission section of an area 102 where the user's instruction has been detected by the corresponding instruction detection section 122 to emit light with a predetermined light emission color, a predetermined light emission intensity, and a predetermined light emission pattern, or changes an image displayed on the display section of the area 102, whereby this area 102 can be visually differentiated from the other areas.

Also, when programs generated based on programming operations are executed to drive the target device 200, each identification alteration section 124 causes the light emission section of an area 102 corresponding to a movement position of the target device 200 to emit light with a predetermined light emission color, a predetermined light emission intensity, and a predetermined light emission pattern, or changes an image displayed on the display section of the area 102, whereby this area 102 can be visually differentiated from the other areas. Note that examples of the alteration status of each identification alteration section 124 (the light emission status of its light emission section) at the time of programming operation and the time of program execution are described later in detail in descriptions of the programming method.

In FIG. 2, the structure has been shown in which, as the identification alteration sections 124, light emission sections or display sections have been individually provided corresponding to each area 102 of the programming area 104. However, the present invention is not limited thereto. For example, a structure such as that shown in FIG. 3 may be adopted in which a common luminescence panel or a common display panel is provided on the entire programming area 104 as an identification alteration section 124. In this structure, in a programming operation, the identification alteration section 124 causes a portion of the luminescence panel corresponding to an area 102 indicated by the user to emit light with a predetermined light emission color, a predetermined light emission intensity, and a predetermined light emission pattern, or changes an image displayed on the indicated area on the display panel, whereby this area 102 can be visually differentiated from the other areas. Also, when a program generated based on a programming operation is executed, the identification alteration section 124 causes an area on the luminescence panel which corresponds to a movement position of the target device 200 to emit light with a predetermined light emission color, a predetermined light emission intensity, and a predetermined light emission pattern or changes an image displayed on the display panel, whereby this area can be visually differentiated from the other areas. Note that, as a luminescence panel or a display panel to be applied as the identification alteration section 124, a panel where LEDs have been two-dimensionally arranged, a liquid crystal display panel, or an organic EL display panel can be used. With this structure, the resolution of the luminescence or touch panel of the identification alteration section 124 is improved, and more colorful luminescence operations and display operations can be performed with higher definition. Accordingly, the movement route of the target device 200 and the corresponding areas can be vividly and clearly differentiated at the time of programming operation and the time of program execution. In the structure shown in FIG. 3, a common touch panel is provided in the entire programming area 104 as an instruction detection section 122. However, in this structure where a luminescence panel or a display panel is provided as an identification alteration section 124, instruction detection sections 122 individually corresponding to each area 102 may be provided. Also, a structure may be adopted in which, in addition to the light emission sections or the display sections, audio sections or vibration sections are further provided in the identification alteration sections 124, and each identification alteration section 124 changes the amplitude, frequency, and pattern of sound or vibration. By this structure, indicated areas 102 can be more unfailingly differentiated through the user's auditory sense and tactile sense, in addition to his or her visual sense.

Each block I/F section 126 detects the presence of a programming block 140 placed on an area 102 in the programming area 104 and information (hereinafter referred to as "stacking identification information") regarding the stacking state including the number of programming blocks 140 stacked on the area 102, and receives information (hereinafter referred to as "height setting information") having a unit change amount that is set in advance in this programming block 140 to set a position in the height direction (vertical direction to a horizontal plane) in an absolute coordinate system of the target device 200. Specifically, the block I/F sections 126 have non-contact or contact type interfaces individually provided corresponding to each area 102 of the programming area 104. When one of the block I/F sections 126 detects, by its non-contact or contact type interface, a state where a programming block 140 has been placed on an indicated area in the programming area 104, this block I/F section 126 identifies the position and stacking state of the programming block 140 in the programming area 104, and receives the height setting information of the programming block 140. The information (hereinafter referred to as "block position information") regarding the position of the programming block 140 acquired by the block I/F section 126, the stacking identification information, and the height setting information are associated with one another and stored in order in the storage area of the storage section 128 described later. Here, in a structure where non-contact type interfaces have been applied as the block I/F sections 126, a method using short distance radio communication technology such as NFC (Near Field Communication) that is used for electronic money cards or the like, or an optical communication method using infrared rays or the like may be adopted. Also, in a structure where contact type interfaces have been applied, a method may be adopted in which terminal electrodes are directly connected to each other.

Note that, in a case where each instruction detection section 122 has a capacitive touch sensor or touch panel, a configuration may be adopted in which a dielectric material whose permittivity is substantially the same as the human body is used to a part or the entire area of each programming block 140, and whether a programming block 140 has been placed on (brought into contact with) the programming area 104 (whether there is a programming block 140) is detected by the corresponding instruction detection section 122. Also, in a case where each instruction detection section 122 has a pressure-sensitive touch sensor or touch panel or a push switch, a configuration may be adopted in which whether a programming block 140 has been placed on (brought into contact with) the programming area 104 (whether there is a programming block 140) is detected by the corresponding instruction detection section 122 by the programming area 104 being lightly pressed by the programming block 140.

The storage section 128 sequentially stores indicated position information regarding the positions of indicated areas 102 acquired by the instruction detection sections 122 in a storage area. Here, by arranging the indicated position information stored in the storage area of the storage section 128 in chronological order, information regarding the sequence of the user's instructions (hereinafter referred to as "sequential order information") can be acquired. The above-described indicated position information and sequential order information define a movement component in a horizontal direction acquired by the movement route of the target device 200 whose operating state is controlled by the user's programming operations being projected onto a horizontal plane. That is, when the user indicates two or more adjacent areas 102 in the programming area 104, a virtual route defining an operating state on a horizontal plane of the movement route of the target device 200 is determined. In other words, when supposing that a group of line segments each of which has been created by the connection of two adjacent areas 102 in the virtual route determined by the user indicating two or more adjacent areas 102 in the programming area 104 is a first shape, a route having a similar shape to this first shape is defined as a movement component in the horizontal direction of an actual movement route of the target device 200.

Also, the storage section 128 stores block position information regarding the position of a programming block 140 acquired by a block I/F section 126, height setting information for setting the position of the target device 200 in the height direction, and stacking identification information regarding a stacking state including the number of stacked programming blocks 140 in association with one another. Here, in the core unit 160 described later, by multiplying the unit change amount of height setting information associated with each block position information by the number of stacked programming blocks 140 in stacking identification information, the position of the target device 200 in the height direction in each indicated area 102 determining the above-described virtual route is set. Then, a route acquired by adding this set position in the height direction to a position corresponding to each indicated area 102 of the above-described virtual route is defined as a movement route of the target device 200 in the actual three-dimensional space. In other words, when supposing that the three-dimensional shape acquired by adding the position in the height direction (height component in the vertical direction) set in each indicated area 102 to the first shape that defines the virtual route described above is a second shape, a route having a three-dimensional third shape that is similar shape as this second shape is defined as an actual movement route of the target device 200.

This storage section 128 may store a program for controlling the operation of each section of the programming board 120 by the later-described control section 132 and various types of information. That is, the storage section 128 has a RAM (Random Access Memory) and a ROM (Read-Only Memory).

The external I/F section 130 performs communication between the programming board 120 and the core unit 160 described later, and transmits indicated position information, sequential order information, block position information, stacking identification information and height setting information (hereinafter collectively referred to as "input operation information") stored in the storage area of the storage section 128 to the core unit 160. Specifically, the external I/F section 130 has a non-contact or contact type interface. Here, in a structure where a non-contact interface has been applied as the external I/F section 130, a wireless communication method such as NFC, Bluetooth (registered trademark), Wi-Fi (Wireless Fidelity; registered trademark) or an optical communication method using infrared rays can be used. Also, in a structure where a contact type interface has been applied as the external I/F section 130, a cable communication method using various types of communication cables or a method where terminal electrodes are directly connected to each other can be used.

The control section 132 is a processor of a computer which controls the operation of each section of the programming board 120 having the instruction detection sections 122, the identification alteration sections 124, the block I/F sections 126, the storage section 128, and the external I/F section 130. In particular, when the user's instructions performed on areas 102 in the programming area 104 are detected by the instruction detection sections 122, the control section 132 sequentially stores the indicated position information of these areas 102 in the storage area of the storage section 128. In addition, the control section 132 causes these areas 102 to emit light in predetermined light emission states or changes displayed images by the corresponding identification alteration sections 124 so as to alter the areas to be visually differentiated. Also, when a state where a programming block 140 has been placed on an indicated area 102 is detected by the corresponding block I/F section 126, the control section 132 acquires height setting information set in this programming block 140 and stacking identification information regarding the stacking state of the programming block 140 via the block I/F section 126, and stores the function information and the block position information of the programming block 140 in association with each other in the storage area of the storage section 128. Also, the control section 132 transmits various types of information stored in the storage area of the storage section 128 by programming operations to the core unit 160 via the external I/F section 130.

(Programming Blocks 140)

Each programming block 140 is a tangible object that can be directly and physically touched in real space, has a substantially cubical (or substantially rectangular parallelepiped) shape, and is placed on an arbitrarily indicated area 102 in the programming area 104 of the programming board 120 by the user, as shown in FIG. 1. This programming block 140 functions as an input device for setting the position of the target device 200 in the height direction on each indicated area 102 of the programming areas 104 when the target device 200 is operated. Here, these programming blocks 140 are placed by being stacked on the programming area 104 as a single tier block or multi-tiered blocks in accordance with the position in the height direction set in the target device 200. Also, the three-dimensional shape of each programming block 140 is not limited to a cubic shape or a rectangular parallelepiped shape, and may be any polyhedron shape as long as the programming blocks 140 can be stably placed in the programming area 104 and can be stably stacked on one another. Also, it is not limited to these examples and may be a shape whose surface is partially a curved shape, such as a substantially cylindrical shape, a substantially conical shape, a substantially truncated-conical shape, a substantially sphere shape, and a substantially hemisphere shape. Also, in order to stably place the programming blocks 140 in the programming area 104 or stably pile them on one another and to unfailingly transmit the above-described height setting information and stacking identification information regarding the stacking state of the programming block 140 to the programming board 120, the undersurface of a placed programming block 140 should preferably and appropriately comes in close with the upper surface of the programming board 120 or the upper surface of another programming block 140 where the programming block 140 has been placed. Accordingly, their contact surfaces may have convex and concave shapes which engage with each other, or may be formed to be magnetically attached to each other.

Specifically, each programming block 140 has, for example, a block I/F section 141 on an undersurface side (the undersurface side of the cubic shape in FIG. 1), a block I/F section 142 on a upper surface side (the upper surface side of the cubic shape in FIG. 1), an identification alteration section 144, a storage section 146, and a control section 148, as shown in FIG. 2.

The block I/F section 141 on the undersurface side communicates with the programming board 120 or another programming block 140 stacked on the under tier, and the block I/F section 142 on the upper surface side communicates with another programming block 140 stacked on the top tier. As a result, the height setting information stored in the storage area of the later-described storage section 146 and the stacking identification information regarding the stacking state of the programming block 140 are directly transmit to the programming board 120 or indirectly transmit to the programming board 120 through the lower programming block 140.

More specifically, the block I/F sections 141 and 142 have non-contact or contact type interfaces individually provided, for example, on two opposite surface sides (the undersurface side and the upper surface side of the cubic shape in FIG. 1) of the cubic shape of the programming block 140. When the non-contact or contact type interfaces detect a state where the programming block 140 has been placed on an indicated area in the programming area 104 and a state where another programming block 140 has been stacked on the programming block 140, the block I/F sections 141 and 142 transmit height setting information set in the programming block 140 and stacking identification information regarding the stacking state of the programming block 140 to the programming board 120. Here, the block I/F sections 141 and 142 can communicate with the programming board 120 and other stacked programming blocks 140 in the same manner as described above, even when the block I/F sections 141 and 142 invert the top and bottom of the programming block 140 and arrange the block I/F section 142 on the undersurface side of the cubic shape, and arrange the block I/F section 141 on the upper surface side of the cubic shape of the programming block 140. That is, the block I/F section 141 on the undersurface side and the block I/F section 142 on the upper surface side have the same functions, and the same method as the various methods is applied for each block I/F section 126 of the programming board 120 described above.

In the present embodiment, the case has been described in which the individual block I/F sections 141 and 142 having the same function are provided on the two opposing surfaces (the upper surface and the undersurface) of the programming block 140 having a cubic shape. However, the present invention is not limited thereto. For example, the programming board on the undersurface side and other programming blocks stacked on the upper surface side or the undersurface side may communicate by a single block I/F section provided in the programming block.

Also, in another configuration, for example, a structure may be adopted in which the block I/F sections 142 are provided on all the six surfaces of the programming block 140 or a common interface is provided thereon so that the communication can be performed between the programming block 140 and the programming board 120 or another programming block 140 regardless of which surface of the cube serves as a contact surface for placing to the programming board 120 or which surface has another programming block 140 stacked thereon.

The identification alteration section 144 has a light emission section or a display section. In a programming operation using the programming board 120, when a state where the programming block 140 has been placed on an area 102 in the programming area 104 is detected by the block I/F section 142, the identification alteration section 144 causes the light emission section to emit light in a predetermined light emission state or changes an image displayed on the display section so as to visually differentiate the programming block 140 from the other programming blocks 140, as with each identification alteration section 124 of the programming board 120 described above.

Note that, as the above-described display section to be applied in the identification alteration section 144, a display section may be adopted which changes a displayed image without electrical power. For example, a structure that uses magnetic force may be adopted in which a permanent magnet is provided in each portion of the programming board 120 corresponding to the areas 102 of the programming area 104 and in each programming block 140 and, when a programming block 140 is placed on an area 102, its display section is rotated by attraction force or repelling force occurred between a permanent magnet in the programming board 120 and a permanent magnet in the programming block 140, whereby an image thereon is changed. Also, a mechanical structure may be adopted in which a convex section that is internally pressed and displaced by being placed on the programming board 120 is provided on at least one side of each programming block 140 which is placed on the programming board 120. In this structure, when a programming block 140 is placed on an area 102, the convex section of the programming block 140 is internally pressed and displaced, and its display section is rotated in conjunction with the displacement, whereby an image thereon is changed.

Also, when operations in the three-dimensional are performed by the target device 200 by programs created based on programming operations, the corresponding identification alteration sections 144 cause the light emission sections of their programming blocks 140 that have defined the position of the target device 200 in the height direction to emit light in predetermined light emission states or changes images displayed on the display sections of the programming blocks 140 so as to visually differentiate the programming blocks 140 from the other programming blocks 140.

Note that each identification alteration section 144 may be structured to include an audio section or a vibration section in addition to the above-described light emission section or display section, and change the amplitude, frequency, and pattern of sound or vibration, as with each identification alteration section 124 of the programming board 120 described above. By this structure, programming blocks 140 that have defined function operations can be more unfailingly differentiated through the user's auditory sense and tactile sense, in addition to his or her visual sense.

The storage section 146 has stored therein height setting information having a unit change amount for setting the position of the target device 200 in the height direction when the target device 200 is operated in the three-dimensional space. Here, examples of this height setting information for setting the position of the target device 200 in the height direction include a numerical value (for example, 10 cm rise relative to a height in an immediately preceding area) indicating a relative change amount in the height direction at a position corresponding to an area 102 where a programming block 140 has been placed. However, the present invention is not limited thereto, and a configuration may be adopted which has, as height setting information, a numerical value (for example, 10 m height position from the ground) indicating an absolute position in the height direction at a position corresponding to an area 102.

Also, the storage section 146 temporarily stores, in its storage area, height setting information and stacking identification information which are transmitted from another programming block 140 stacked on its own programming block 140. Furthermore, the storage section 146 may store a program for controlling the operation of each section of the programming block 140 by the later-described control section 148 and various types of information. That is, the storage section 146 includes a RAM and a ROM.

In the above-described present embodiment, height setting information having a single unit change amount for the programming block 140 is fixedly stored in advance in the storage area of the storage section 146. However, the present invention is not limited thereto. For example, a configuration may be adopted in which height setting information having a plurality of unit change amounts for the programming block 140 is stored in advance in the storage area of the storage section 146, and an arbitrary unit change amount is selected and set from among the plurality of unit change amounts based on a setting change by software, an operation on a selector switch, the detection of the inclination of the programming block 140 or the detection of an impact thereon by a gravity sensor and an acceleration sensor and the like.

Also, another configuration may be adopted in which the block I/F sections 142 are provided on all the six surfaces of the programming block 140 having a cubic shape, unit change amounts different from one another are associated with the six surfaces, respectively, and height setting information having each unit change amount is stored in the storage area of the storage section 146. When a surface that is in contact with the programming board 120 directly or indirectly is detected by the block I/F section 142 on this surface, height setting information associated with this contact surface is read out from the storage area of the storage section 146 and transmitted to the programming board 120. By this configuration, the position of the target device 200 in the height direction is set based on plural types of unit change amounts according to the surface of the programming block 140 which comes in contact with the programming board 120. In this case where unit change amounts different from another are respectively associated with two or more surfaces of the programming block 120, for example, a structure may be adopted in which a character, a symbol, an illustration, an image or the like representing the unit change associated with a contact surface is drawn on the surface (cube upper surface) opposing this contact surface (cube lower surface) that comes in contact with the programming board 120, so that the contents of the unit change for setting the position in the height direction of the target device 200 can be intuitively and visually recognized.

The control section 148 is a processor of a computer which controls the operation of each section of the programming block 140 including the block I/F section 142, the identification alteration section 144, and the storage section 146. In particular, when a state where the programming block 140 has been placed on an indicated area 102 is detected by the block I/F section 141 (or 142), the control section 148 transmits height setting information set in the programming block 140 and stacking identification information regarding to the stacking state of the programming block 140 to the programming board 120 via the block I/F section 142, and causes the programming block 140 to emit light in a predetermined light emission state or changes an image displayed thereon by the identification alteration section 144 so as to alter the programming block 140 to be visually distinguishable.

(Core Unit 160)

The core unit 160 has, for example, a rectangular parallelepiped shape or a flat plate shape, and operation switches are arranged on one side (the upper surface in the drawing) thereof, as shown in FIG. 1. This core unit 160 functions as a control device that generates programs for operating the target device 200 based on information acquired by programming operations performed using the programming board 120, and executes the programs so as to control the operating state of the target device 200.

More specifically, the core unit 160 includes, for example, an operation section 162, an external I/F section 164, a storage section 166, a communication interface section (hereinafter referred to as "communication I/F section") 168, a control section 170 and a power supply section 172, as shown in FIG. 2.

The operation section 162 generates, by a user operation, a program based on information acquired by a programming operation performed using the above-described programming board 120, and gives an instruction on the execution status of the program. More specifically, the operation section 162 has a plurality of push switches or touch sensors or a touch panel for selecting the execution status of a generated program. In the present embodiment, the operation section 162 has arranged thereon push switches such as a batch execution switch 112 for collectively executing all programs generated by the control section 170 described below, a stepwise execution switch 114 for executing commands given by programs step by step, an execution stop switch 116 for stopping a program currently being executed, and a home switch 118 for returning the target device 200 to its initial position (start point), as shown in FIG. 1. When a state is detected in which the user has depressed or touched one of the switches, the operation section 162 outputs a control signal for instructing the generation of a program and its execution status to the later-described control section 170 in response to the switch operation.

The external I/F section 164, which performs communication between the core unit 160 and the programming board 120, receives input operation information transmitted from the programming board 120, and stores it in a storage area of the storage section 166. The storage section 166 stores this input operation information received from the programming board 120 via the external I/F section 164 in its predetermined storage area and stores, in another storage area, programs generated by the later-described control section 170 based on this information. This storage section 166 may store a program that is used to generate, in the control section 170, programs for controlling the operating state of the target device 200 based on received input operation information, a program for controlling the operation of each section of the core unit 160, and various types of information. That is, the storage section 166 has a RAM and a ROM.

The communication I/F section 168 performs communication between the core unit 160 and the target device 200, and transmits programs stored in the storage area of the storage section 166 to the target device 200. Specifically, the communication I/F section 168 has a non-contact or contact type interface. In a structure where a non-contact interface has been adopted, a wireless communication method such as Wi-Fi (registered trademark) and Bluetooth (registered trademark) or an optical communication method using infrared rays can be used. Also, in a structure where a contact type interface has been adopted, a cable communication method using a communication cable can be used.

The control section 170 is a processor of a computer that controls the operation of each section of the core unit 160 including the operation section 162, the external I/F section 164, the storage section 166, the communication I/F section 168, and the power supply section 172 described later. In particular, when the operation section 162 detects the user's instruction regarding the generation or execution of programs, the control section 170 generates programs for controlling the operating state of the target device 200 based on input operation information transmitted from the programming board 120.

More specifically, when the batch execution switch 112 or the stepwise execution switch 114 is operated and its depressed or contact state is detected in the operation section 162, the control section 170 generates programs including commands for controlling the operating state of the target device 200 moving in the three-dimensional space, based on input operation information (indicated position information, sequential order information, block position information, stacking identification information and height setting information) transmitted from the programming board 120. Here, each of the above-described information acquired by programming operations performed using the programming board 120 corresponds to a program source code, and the control section 170 converts (compiles) this source code into a program composed of executable machine language in the target device 200. The program which performs conversion processing is stored in another storage area of the storage section 166. Note that this conversion processing may be collectively performed for the entire program, or may be performed for each command of one step of the program.

Also, the control section 170 transfers generated programs to the target device 200 in response to a switch operation performed on the operation section 162, and thereby controls the operating state of the target device 200. Furthermore, the control section 170 controls the supply status of driving power for each section of the core unit 160, the programming board 120, and the programming block 140 by the power supply section 172.

The power supply section 172 supplies driving power to each section of the core unit 160. Also, by the core unit 160 and the programming board 120 being connected, the power supply section 172 supplies driving power to each section of the programming board 120 via the external I/F sections 164 and 130. The electric power supplied to the programming board 120 is further supplied to each programming block 140 through their block I/F sections 126 and 141 (or 142). Here, for example, the power supply section 172 may receive electric power from a commercial AC supply, or may be provided with primary batteries such as dry cells or rechargeable batteries such as lithium ion batteries, or a power generation section by energy harvesting technology.

In the present embodiment, only the core unit 160 is equipped with a power supply section, and the programming board 120 and the programming blocks 140 are not equipped with a power supply section. In this embodiment, by the core unit 160 and the programming board 120 being connected, driving electric power is supplied to the programming board 120 from the core unit 160 via power supply mechanisms in their external I/F sections 164 and 130. In addition, by programming blocks 140 being placed on the programming board 120, driving electric power is supplied to the programming blocks 140 from the programming board 120 via power supply mechanisms in their block I/F sections 126 and 141 (or 142). Here, as these power supply mechanisms which are provided in the external I/F sections 130 and 164 and the block I/F sections 126 and 141, non-contact type power supply mechanisms such as electromagnetic induction type power supply mechanisms or contact type power supply mechanisms where cables and terminal electrodes are directly connected may be adopted.

Also, as another structure that can be applied to the present invention, a structure where the programming board 120 and the programming blocks 140 have unique power supply sections or a structure where the programming board 120 or the programming blocks 140 have unique power supply sections may be adopted. In the structure where the programming board 120 has a unique power supply section, a configuration may be adopted in which driving electric power is supplied to programming blocks 140 from the programming board 120 via power supply mechanisms in their block I/F sections 126 and 141.

With this structure where at least the programming board 120 has a unique power supply section, the user can perform programming operations using the programming board 120 and programming blocks 140 even when the core unit 160 has not been connected to the programming board 120. In addition, program generation processing based on input operation information and the control of the operating state of the target device 200 can be performed with the core unit 160 being separated from the programming board 120 and being independent (that is, by the core unit 160 alone), when a switch of the operation section 162 is operated.

(Guide Sheet 180)

The guide sheet 180 is, for example, a tangible thin film or board which is light transmissive (transparent or semi-transparent), and placed and mounted on the programming area 104 of the programming board 120, as shown in FIG. 1. On the guide sheet 180, images (illustrations, photographs, numbers, characters, signs and the like) for supporting and guiding the user's programming operation are drawn in advance. In other words, on the guide sheet 180, information for indicating a virtual route that defines a movement route of the target device 200 has been recorded. Here, on the guide sheet 180, a plurality of partitions 106 corresponding to each area 102 of the programming areas 104 of the programming board 120 are provided, and the above-described images are drawn with these partitions 106 as base units. More specifically, for example, in a case where roads, lanes, and topography of mountains, rivers, seas, and the like are drawn on the guide sheet 180, images therefor are successively provided on adjacent partitions 106. In a case where houses and trees are drawn, images therefor are provided in units of one or a plurality of partitions 106.

Also, when performing a programming operation of determining a virtual route corresponding to a movement component in the horizontal direction of a movement route of the target device 200, the user touches or depresses one of the plurality of partitions 106 of the guide sheet 180, as described above. In the case where a capacitive touch sensor is applied as each instruction detection section 122, the guide sheet 180 has characteristics (dielectric characteristics) of protecting the programming area 104 and appropriately transmitting to each touch sensor the contact status of a dielectric substance such as the user's finger. In this case, in response to the above-described touch operation, an instruction detection section 122 detects a capacitance change in an area 102 of the programming area 104 of the programming board 120 right under the touched partition 106, as with a case where the area 102 is directly touched. Also, in the case where a pressure-sensitive touch sensor or a push switch is applied as each instruction detection section 122, this instruction detection section 122 detects, in response to the above-described touch operation, a displacement of an area 102 of the programming area 104 of the programming board 120 right under the pressed partition 106, as with a case where the area 102 is directly pressed.

In the programming operation in which the user sets the position of the target device 200 in the height direction on the movement route on the horizontal plane, on partitions 106 of the guide sheet 180 placed on the programming board 120 (which correspond to areas 102 of the programming area 104), one or a plurality of programming blocks 140 are placed in accordance with the position of the target device 200 in the height direction, as described above. Then, information is transmitted and received between each programming block 140 and the programming board 120 via the guide sheet 180 by using a predetermined communication method. Here, in a case where a method using wireless communication technology such as NFC or optical communication technology such as infrared communication is adopted for the block I/F sections 142 and 126 of each programming block 140 and the programming board 120, the guide sheet 180 has a characteristic or a form that transmits radio waves or light for this communication. Also, in a case where a method using optical communication such as infrared communication is adopted for the block I/F sections 142 and 126, the guide sheet 180 has a characteristic or a form that transmits infrared light. Moreover, in a case where a method is adopted in which terminal electrodes are directly connected to each other, the guide sheet 180 may have a structure in which an opening section (through-hole) where the block I/F section 142 of a programming block 140 and a block I/F section 126 of the programming board 120 directly come in contact with each other is provided in each partition 106, or a structure in which a through electrode (conductive material exposed from both the front and rear surfaces of the guide sheet 180) for electrically connecting these block I/F sections 142 and 126 is provided in each partition 106.

Then, based on terrains and the like drawn on the guide sheet 180, the user sequentially indicates areas 102 of the programming board 120 via the guide sheet 180, and places a programming block 140 in each area 102, and thereby determines a movement route of the target device 200 in the three-dimensional space. By plural types of guide sheets 180 having specific images related to programming operations as described above being prepared in accordance with the contents of programming and a guide sheet 180 to be attached to the programming area 104 being suitably replaced, programming operations having different contents can be appropriately supported and the efficiency of programming learning can be improved.

Also, by a programming operation using such a guide sheet 180, when an area 102 indicated by the user's programming operation or an area 102 corresponding to a movement position of the target device 200 at the time of the execution of a generated program is caused to emit light in a predetermined light emission state or caused to change its displayed image by the corresponding identification alteration section, this light or image is visually recognized through the light transmissive guide sheet 180.

(Target Device 200)

The target device 200 is a target of programs generated by the program control device 100 based on an input operation by the user. In the present embodiment, as the target device 200, a tangible flying object such as a drone that three-dimensionally flies in a predetermined airspace in real space is adopted as shown in, for example, FIG. 1. However, any object may be adopted as the target device 200 as long as its operating state in the three-dimensional space can be controlled based on a generated program. Also, in addition to a tangible movable object, an object may be adopted which is in application software performed in a mobile terminal such as a smartphone or a tablet or an information communication device such as a personal computer, or in a virtual space actualized by this application software. That is, an intangible movable object may be adopted.

In the case where the target device 200 is a tangible movable object, this target device 200 includes a communication I/F section, a driving section, a storage section, a function section, a power supply section and a control section. The communication I/F section of the target device 200 communicates with the communication I/F section 168 of the core unit 160, and receives programs generated by the control section 170 of the core unit 160. Also, the storage section stores the programs received by the communication I/F section of the target device 200. The control section controls the function section, the driving section, the power supply section and the like described later in detail in accordance with the programs stored in the storage section of the target device 200, and operates the target device 200.

The target device 200 is moved three-dimensionally along a movement route in the three-dimensional space determined by the user sequentially indicating each area 102 of the programming area 104 covered by the guide sheet 180 and placing a programming block 140 in each area 102 in the programming operation using the programming board 120. Here, the target device 200 is moved along this movement route on a tangible terrain (actual terrain) 202 corresponding to an image (similar image) acquired by enlarging the image of the guide sheet 180 used in the programming operations.

Note that the target device 200 of the present embodiment is not limited to the air vehicle such as a drone shown in FIG. 1, and may be any device as long as it moves in a specific horizontal plane and its component in a direction perpendicular to the horizontal plane changes. For example, it may be a submersible vehicle which dives underwater, a self-propelled tangible toy which jumps to a predetermined height at a predetermined position while traveling on the ground, or a waterborne vehicle which spews water to a predetermined height at a predetermined position while moving on the water. Here, in the case where the target device 200 is an air vehicle or a submersible vehicle shown in this embodiment, the target device 200 may ascend to the constant altitude from the ground or go under water to the constant depth at the start point of a movement route, and descend to the ground or float to the surface at the endpoint of the movement route.

Also, in the case where application software that is performed in a mobile terminal or an information and communication device has been adopted as a target device 200, the operating state of the above-described object (such as a character, an item or the like on a game screen) is controlled in a virtual three-dimensional space achieved by the application software, whereby the object moves in an arbitrary route in the three-dimensional space.

(Programming Operations, Program Generation, and Execution Method)

Next, programming operations, program generation, and an execution method (programming method) for the programming educational device of the present embodiment are described.

Figure 4:
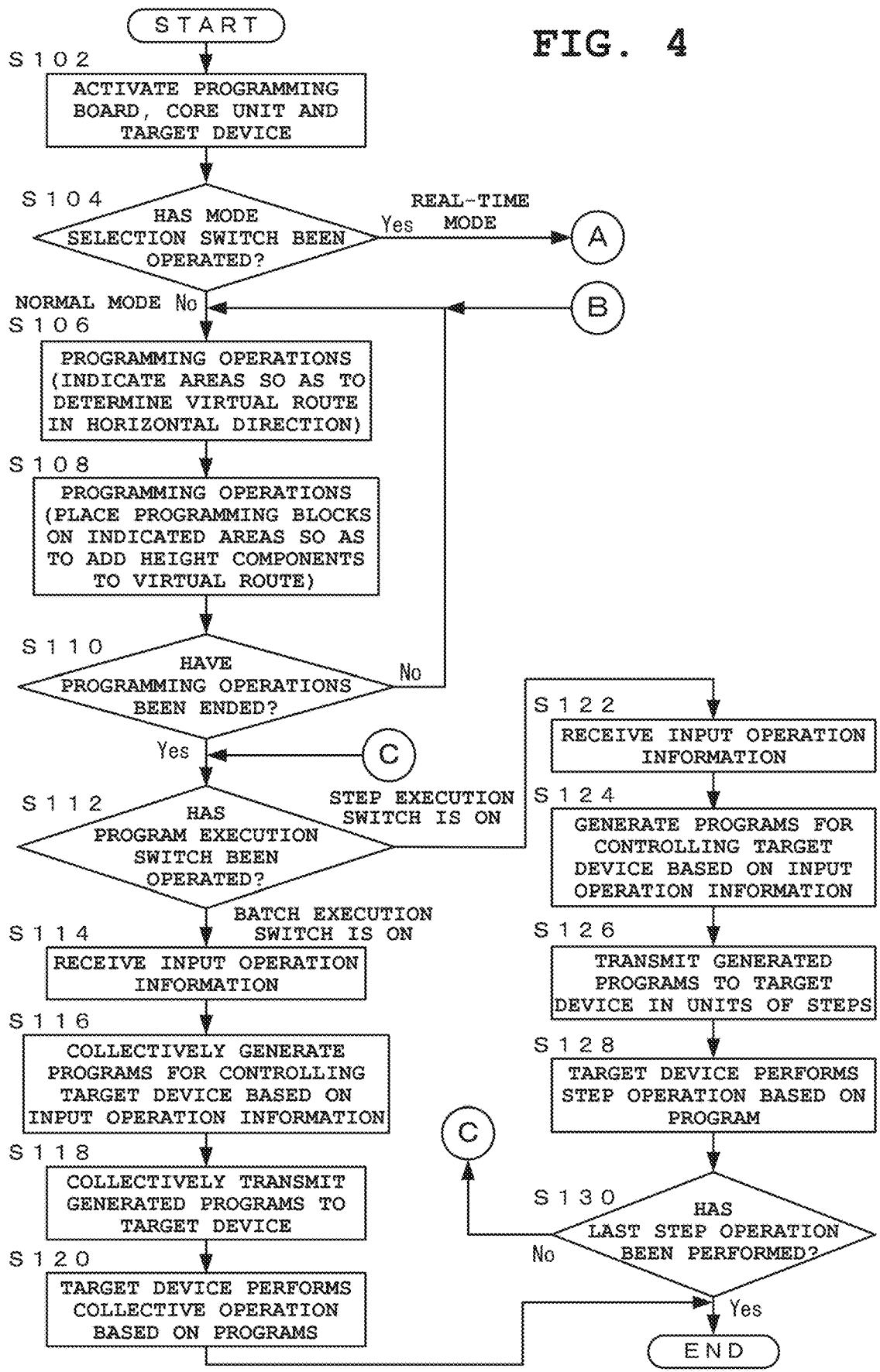
FIG. 4 is a flowchart showing an example (normal mode) of a procedure including programming operations, program generation, and an execution method in the programming educational device according to the present embodiment.
Figure 7:
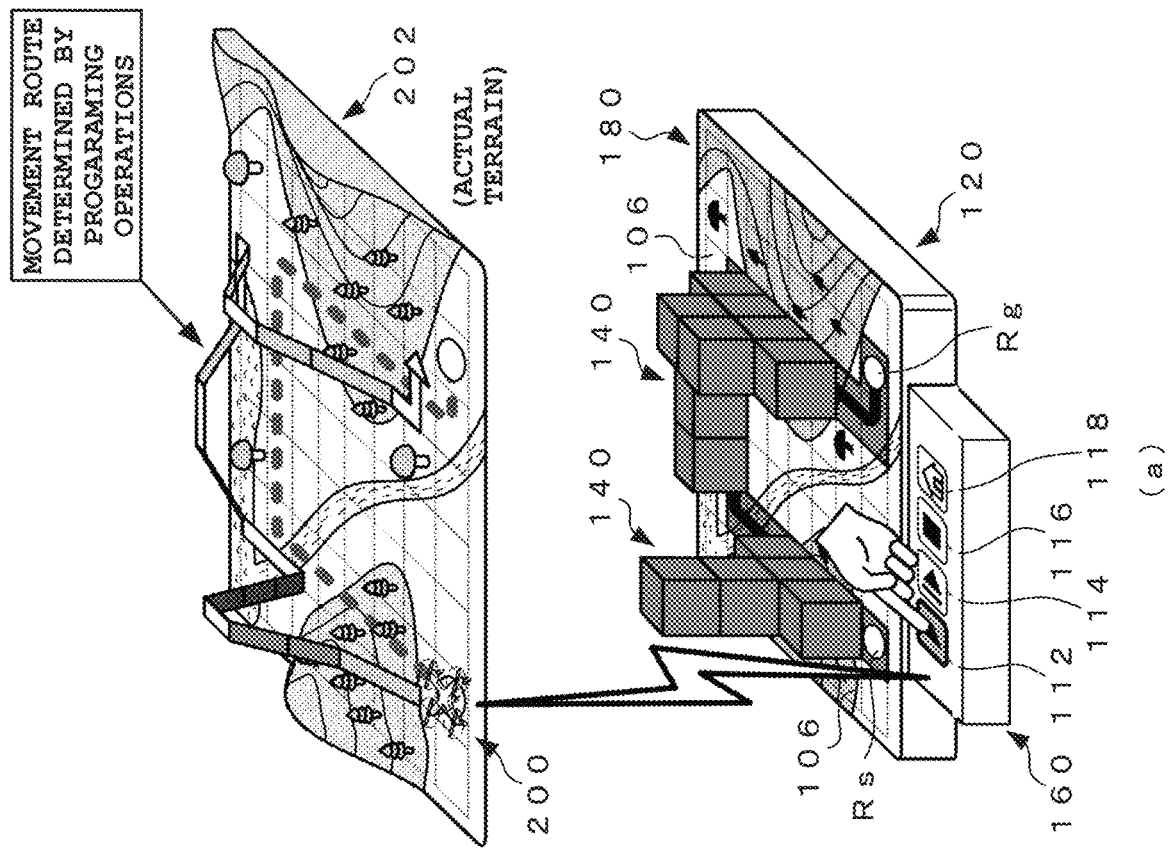
FIG. 7 is a first schematic diagram for describing program generation and execution processing (batch processing) applied in the present embodiment.
Figure 9:
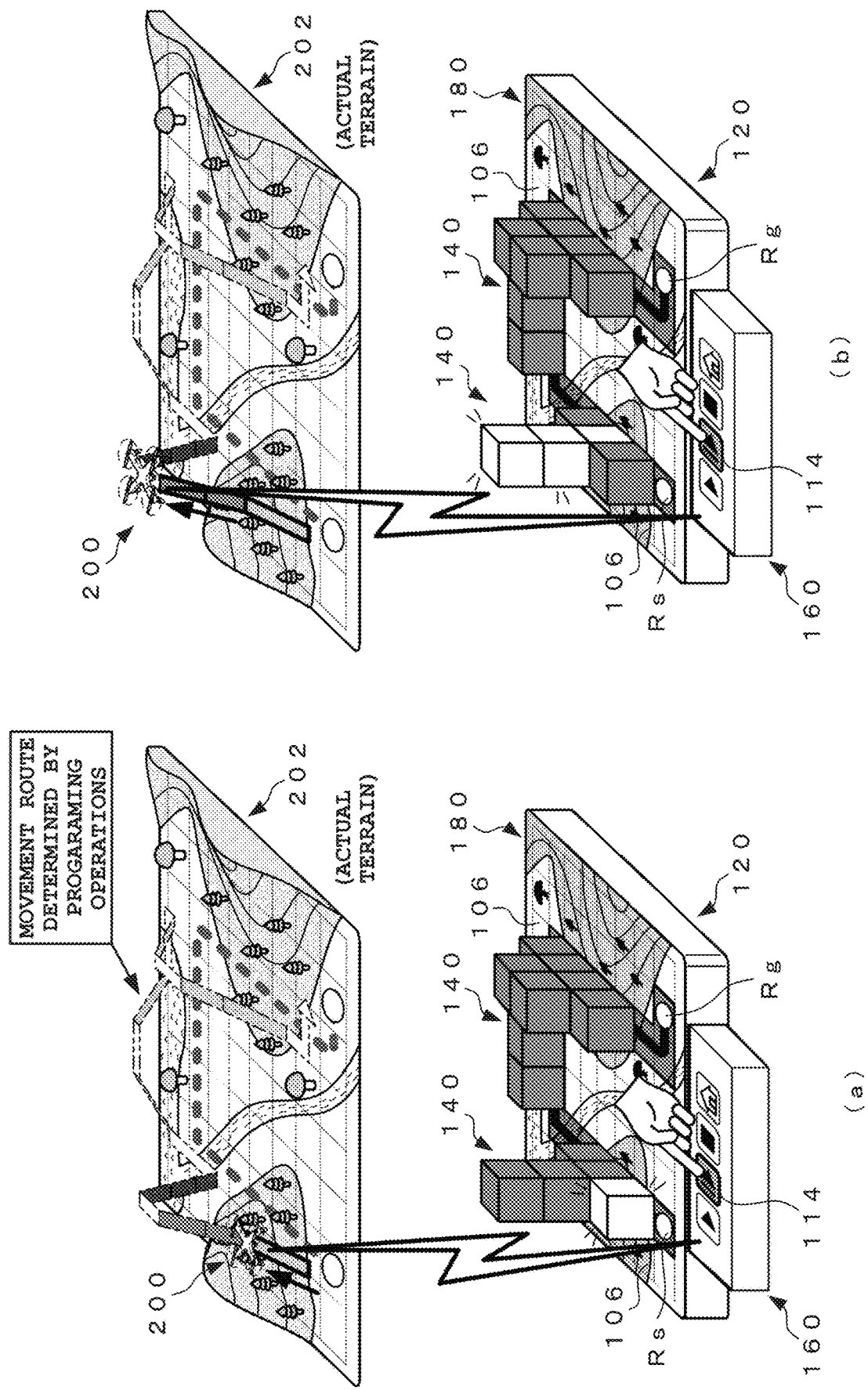
FIG. 9 is a first schematic diagram for describing program generation and execution processing (step processing) applied in the present embodiment.
Figure 10:
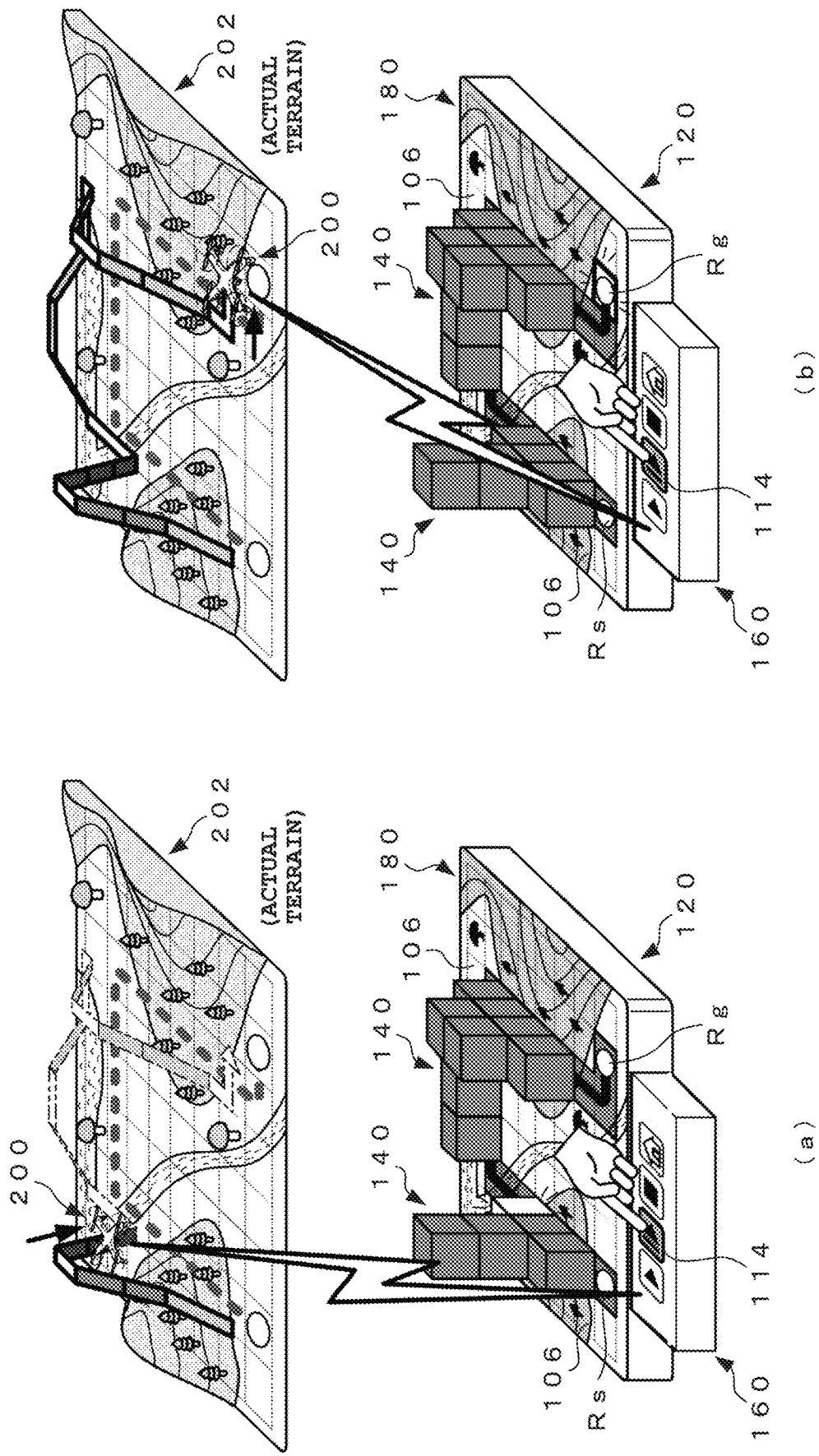
FIG. 10 is a second schematic diagram for describing the program generation and the execution processing (step processing) applied in the present embodiment.

FIG. 4 is a flowchart showing an example (normal mode) of a procedure including the programming operations, the program generation, and the execution method (programming method) for the programming educational device of the present embodiment. Also, FIG. 5 and FIG. 6 are schematic diagrams for describing programming operation processing applied in the present embodiment. FIG. 7 and FIG. 8 are schematic diagrams for describing program generation and execution processing (batch processing) applied in the present embodiment, and FIG. 9 and FIG. 10 are schematic diagrams for describing program generation and execution processing (step processing) applied in the present embodiment. Note that a processing operation (Step S104) related to mode switch setting in the flowchart of FIG. 4 will be described in detail in a modification example described later, and therefore explanations therefor are applicably omitted in the present embodiment.

In the programming operations, the program generation, and the execution method for the programming educational device of the present embodiment, programming operation processing by an input operation using the programming board 120, the programming blocks 140, and the guide sheet 180, program generation processing based on input operation information by use of the programming board 120 and the core unit 160, and program execution processing using the core unit 160 and the target device 200 are principally performed. Each of these control processing of the programming educational device is actualized by each control section provided in the programming board 120, the programming blocks 140, the core unit 160 and the target device 200 described above executing a specific control program independently or in cooperation with one another.

(Programming Operation Processing)

In the programming operation processing by the programming educational device according to the present embodiment, first, a user activates the program control device 100 of the programming educational device by turning on the core unit 160 with the programming board 120 and the core unit 160 being connected to each other, and turns on and activates the target device 200 (Step S102), as shown in the flowchart of FIG. 4, and FIGS. 5 (a) and (b). In addition, the user attaches the guide sheet 180 such that it covers the programming area 104 of the programming board 120.

Here, in the guide sheet 180, an IC chip 182 is provided which has stored therein entire movement route information and adjacent area information described later, as shown in FIG. 2. Also, in the programming board 120, an IC chip reading section 184 is provided which reads out adjacent area information stored in the IC chip 182 of the guide sheet 180. This IC chip reading section 184 reads out data stored in IC chip 182 by using a communication method such as near field communication. When the programming board 120 is turned on and the guide sheet 180 is attached to the programming board 120, entire movement route information and adjacent area information which are unique information of this guide sheet 180 stored in its IC chip 182 are read out by the IC chip reading section 184 of the programming board 120 and stored in the storage area of the storage section 128 by control by the control section 132 of the programming board 120.

Next, the programming operation processing is performed using the programming board 120 having the guide sheet 180 attached thereon and the programming blocks 140. Specifically, first, the user touches or depresses a plurality of partitions 106 (that is, a plurality of areas 102 of the programming area 104) corresponding to a movement component in a horizontal direction of a movement route where the target device 200 is operated and thereby sequentially indicates these partitions 106, with reference to images drawn on the guide sheet 180 attached to the programming board 120, as shown in FIG. 6 (a). Here, in order to determine a movement route of the target device 200, the user sequentially indicates two or more adjacent partitions 106 including a start point (start) Rs and an end point (goal) Rg on the guide sheet 180 in order of the movement of the target device 200.

Here, the above-described entire movement route information and adjacent area information are described in detail. In the present embodiment, the plurality of areas 102 of the programming area 104 are two-dimensionally arranged in matrix direction and any two areas 102 successively arranged in an arrangement direction (row direction or column direction) are regarded as being adjacent to each other. Note that these two areas 102 adjacent to each other may be positioned away from each other at an interval equal to or less than a threshold value that is determined as required. The above-described entire movement route information is information for identifying relative positions of two or more areas 102 corresponding to two or more successive partitions 106 including a start point Rs and an end point Rg, in the programming area 104 of the programming board 120. Also, the above-described adjacent area information is information indicating whether two areas 102 among the plurality of areas 102 are adjacent to each other. The entire movement route information and the adjacent area information are stored in, for example, the storage area of the storage section 128 of the programming board 120. Here, the entire movement route information and the adjacent area information in the storage area may be data stored in the IC chip 182 of the guide sheet 180 and read out by the IC chip reading section 184. Also, a configuration may be adopted in which a plurality of adjacent area information are stored in advance in the storage area of the storage section 128 of the programming board 120, and adjacent area information corresponding to the type of an attached guide sheet 180 is selected by a user operation. As described later in detail, the entire movement route information and the adjacent area information stored in the IC chip 182 of the guide sheet 180 are information for specifying a virtual route that defines an operating state in the horizontal plane of a movement route of the target device 200.

In the present embodiment, adjacent areas of a target area 102 serving as a reference (which is referred to as "102X" for convenience of description) are four areas 102L, 102R, 102U and 102D, which are an area 102L arranged one area to the left side in the row direction, an area 102R arranged one area to the right side, an area 102U arranged one area above in the column direction, and an area 102D arranged one area below, as shown in FIG. 5 (a). Information for identifying this target area 102X, and information associated therewith for identifying the four adjacent areas 102L, 102R, 102U and 102D are stored in the storage area of the storage section 128 of the programming board 120 as adjacent area information. This information for identifying each area 102 includes information regarding the relative position of each area 102 in the programming area 104 of the programming board 120. Specifically, it may be a numerical value that identifies in which column and row each area 102 is located relative to the leftmost column and the uppermost row of the programming board 120. However, this is merely an example.

Note that areas to be taken as adjacent areas of a target area 102X from among the plurality of areas 102 can be arbitrarily set in accordance with the purpose of learning programming. For example, in addition to the above-described four areas 102L, 102R, 102U and 102D, closest four areas 102 arranged along diagonal directions (in the 45-degree directions) intersecting with the arrangement directions with reference to the target area 102X may be taken as adjacent areas 102 of the target area 102X.

Here, in the present embodiment, the plurality of areas 102 have been arranged over the entire programming area 104 of the programming board 120 in the row and column directions. However, the user does not always allow all the areas 102 to receive programming operations when the guide sheet 180 is attached.

More specifically, the user allows programming operations to be performed only on a plurality of areas 102 positioned right under a plurality of partitions 106 showing a black line indicating a virtual route on the guide sheets 180 as shown in FIG. 5 (*b*), and allows no programming operations to be performed on the other areas 102. Here, in a case where one of the four areas 102 (eight areas when including diagonal direction) adjacent to the target area 102X which is an area (instruction prohibited area) where no programming operation is allowed, this instruction prohibited area is judged as an area that is not adjacent to the target area 102X. More specifically, adjacent area information corresponding to the target area 102X is configured not to include information corresponding to this instruction prohibited area. Note that areas other than instruction prohibited areas, that is, areas where programming operations are allowed are referred to as "instruction allowable areas" for convenience. Here, an example is described using the start point Rs. First, no area 102 exists below an area 102 corresponding to the partition 106 of the start point Rs in the column direction. In addition, on an adjacent area 102 located to the right in the row direction and an adjacent area 102 located to the left in the row direction, no black line for indicating a virtual route has been drawn. Therefore, these three areas 102 are not included in the adjacent area information of the area 102 corresponding to the start point Rs. Accordingly, it is only required that information for identifying one area 102 corresponding to the start point Rs and information for identifying one adjacent area 102 (the area 102U in a case where the area 102 corresponding to the partition 106 of the start point Rs is "102X") located above in the column direction are included as the adjacent area information of the area 102 corresponding to the start point Rs.

The control section 132 of the programming board 120 judges whether an area 102 where an input operation by the user has been detected by the corresponding instruction detection section 122 is an area where programming operations are allowed. More specifically, when an area is to be indicated for the first time as the start of a programming operation, only a programming operation on one area 102 corresponding to a start point Rs based on entire movement route information is allowed. Accordingly, when an area is to be indicated for the first time, programming operations on any area 102 not corresponding to the start point Rs are judged as invalid. In that case, control is performed in which, by a speaker or a display section in the programming board 120 which is not shown in the drawing, an error message such as "not programmable area" is outputted, or the light emission section of that area 102 is controlled not to emit light or controlled to emit light in a light emission color and a light emission pattern different from those of normal light emission.

When a programming operation on the area 102 corresponding to the start point Rs is performed by the user, the control section 132 of the programming board 120 waits for a programming operation to be performed on one of the areas 102 included in the adjacent area information of the area 102 corresponding to the start point Rs. Then, when a programming operation on one of the areas 102 included in the adjacent area information is performed, the control section 132 of the programming board 120 further waits for a programming operation to be performed on another area 102. When a programming operation is performed on an area 102 not included in the adjacent area information, the control section 132 outputs an error message. The control section 132 of the programming board 120 receives programming operations as described above until when an instruction on an area 102 corresponding to an end point Rg is detected by the corresponding instruction detection section 122. Then, when an instruction on the area 102 corresponding to the end point Rg and instructions on all areas 102 specified by the entire movement route information are detected by the corresponding instruction detection sections 122, or a judgment is made that programming operations have been ended by a predetermined operation, the control section 132 outputs a message such as "programming is completed" by the speaker or the display section.

As a result, areas 102 of the programming area 104 corresponding to partitions 106 are indicated via the guide sheet 180, whereby a virtual route (start point Rs, endpoint Rg) corresponding to a movement component in the horizontal direction of the movement route of the target device 200 is determined (Step S106), as shown in FIG. 6 (*b*). Here, the control section 132 of the programming board 120 acquires indicated position information of each indicated area 102 detected by the corresponding instruction detection section 122 and sequential order information regarding the order of these instructions, and stores them in the storage area of the storage section 128. In addition, the control section 132 causes the identification alteration section 124 of each indicated area 102 to emit light in a predetermined light emission state or to change a displayed image, and thereby alters them to be visually distinguishable (In FIG. 6 (*a*), they are drawn with a halftone color for convenience).

Here, in the structure where the identification alteration sections 124 have light emission sections, the control section 132 continues (maintains) an operation of causing the light emission section of each indicated area 102 to constantly emit light (lighting) with a predetermined light emission color and a predetermined light emission intensity, change the light emission color, or emit light with a predetermined light emission pattern (flashing), as shown in FIG. 6 (*a*). Also, during the programming operations, when a program confirmation switch (omitted in the drawing) or the like provided on the operation section 162 of the core unit 160 is operated or no programming operation is performed for a predetermined amount of time or when a trigger condition on a time interval given in advance or set by a user operation is satisfied, the control section 132 causes the light emission sections of each of the areas 102 to sequentially emit light by time sharing according to the movement route order already determined as a result of instructions by programming operations. As such, by an altered state (which is a light emitting state in this case) of the identification alteration section 124 of each indicated area 102 being maintained or a predetermined alteration state being shown with a predetermined condition as a trigger, the contents and progress status of programming operations, the movement route determined up to a current point by programming operations, the sequence of movements of the target device 200 and the like can be visually grasped and easily understood.

Also, in addition to the above-described case where a programming operation is performed on an instruction prohibited area, when an anomaly occurs in the operation of the programming control device 100, the control section 132 performs control of outputting an error message such as "operation error" by the speaker or the display section, causing the light emission section of this area 102 not to emit light, or causing the light emission section to emit light in a light emission color and a light emission pattern different from those of normal light emission. As a result, the user is notified of errors or the like in programming operations. Also, in the structure where the programming board 120 has audio sections and/or vibration sections, the control section 132 may give a notification regarding an error or the like in a programming operation by changing the amplitude, frequency and pattern of sound or vibration in the corresponding audio section and/or vibration section, in addition to or in place of the above-described light emission operation of the corresponding light emission section.

Next, on a partition 106 where a position of the target device 200 in a height direction is set among the plurality of partitions 106 (instructed areas 102) serving as the above-described virtual route, the user places a programming block 140 where this function operation has been set, as shown in FIGS. 6 (*b*) and (*c*). For example, as the height setting information of each programming block 140, when the unit change value is set to increase by 10 cm, one programming block 140 is placed in the partition 106 where the position of the target device 200 in the height direction is to be increased by 10 cm from the current position. Three programming blocks 140 are stacked and placed in the partition 106 to be increased by 30 cm. In this case as well, when a programming operation is performed on an instruction prohibited area, the control section 132 of the programming board 120 performs the above-described error processing as required.

As a result, a height component is added to the virtual route corresponding to the movement component of the target device 200 in the horizontal direction (Step S108), and the movement route of the target device 200 in the actual three-dimensional space is defined. Here, the control section 132 of the programming board 120 acquires the block position information, the stacking identification information and the height setting information of each programming block 140 detected by the corresponding block I/F section 126 and its function information via the guide sheet 180 and stores them in the storage area of the storage section 128. Moreover, the control section 148 of each programming block 140 placed by the user causes its identification alteration section 144 to emit light in a predetermined light emission state or changes an image displayed thereon so as to alter each programming block 140 to be visually distinguishable (In FIG. 6 (*a*), they are drawn with a halftone color for convenience).

Here, in the structure where each identification alteration section 144 has a light emission section, each control section 148 continues (maintains) an operation of, for example, causing the light emission section of the corresponding programming block 140 to constantly emit light (lighting) with a predetermined light emission color and a predetermined light emission intensity, change the light emission color, or emit light with a predetermined light emission pattern (flashing), as shown in FIG. 6 (*c*). Also, during the programming operations, when the program confirmation switch (omitted in the drawing) or the like provided on the operation section 162 of the core unit 160 is operated or no programming operation is performed for a predetermined amount of time or when a trigger condition on a time interval given in advance or set by a user operation is satisfied, each control section 148 causes the light emission section of the corresponding programming block 140 to sequentially emit light by time sharing in accordance with the position in the height direction already set as a result of placement by programming operations. As such, by an altered state (which is a light emitting state in this case) of the identification alteration section 144 in each programming block 140 being maintained or a predetermined alteration state being shown with a predetermined condition as a trigger, the contents and progress status of programming operations and the movement route already set by the programming operations can be visually grasped and easily understood.

Also, in addition to the above-described case where a programming operation is performed on an instruction prohibited area, when a judgment is made that a programming block 140 has been placed on a placement prohibited area set in advance or when an anomaly occurs in the operation of the program control device 100, each control section 148 performs control of causing the light emission section of the corresponding programming block 140 not to emit light, outputting a predetermined error message by the speaker or the display section, or causing the light emission section to emit light in a light emission color and a light emission pattern different from those of normal light emission. As a result, the user is notified of errors or the like in programming operations. Also, in the structure where each programming block 140 has an audio section and/or a vibration section, each control section 148 may give a notification regarding an error or the like in a programming operation by changing the amplitude, frequency, and pattern of sound or vibration in the corresponding audio section and/or vibration section, in addition to or in place of the above-described light emission operation of the corresponding light emission section. Note that the placement prohibited area herein may be arbitrarily set in accordance with the purpose of learning programming. For example, an area 102 corresponding to a partition 106 showing a picture (omitted in the drawing) of busy streets, event venues, steel towers and skyscrapers where many people gather may be set as a placement prohibited area. The information of this placement prohibited area is also included in the above-described adjacent area information.

In the present embodiment, until when the user determines a virtual route corresponding to the horizontal movement components of an entire movement route of the target device 200, adds all height components in each area 102 of this virtual route, and ends programming operations, the above-described Steps S106 and S108 are repeatedly performed (No at Step S110). More specifically, when an instruction on the area 102 corresponding to the partition 106 of the end point Rg stored in the storage section 128 of the programming board 120 and instructions on all the areas 102 indicated by the entire movement route information are detected by the instruction detection section 122, the control section 132 of the programming board 120 judges that the programming operations have been ended.

Note that the programming operations shown in Steps S106 and S108 may be operations of sequentially adding the height component in each area 102 of the virtual route while gradually determining a virtual route, or may be operations of adding all height components in each area 102 of the virtual route after determining an entire virtual route of the target device 200. In a case where only an operation of moving the target device 200 at a fixed height position along a predetermined movement route without changing the height position is performed, the above-described programming operation at Step S108 for placing programming blocks 140 on the guide sheet 180 is omitted.

Then, in a state where the programming operation processing using the programming board 120 and the programming blocks 140 has been ended as shown in FIG. 6 (*c*), the control sections 132 and 148 maintain altered states of the identification alteration sections 124 of the indicated areas 102 corresponding to the total movement route having the position in the height direction determined by the programming operations and altered states of the identification alteration sections 144 of the programming blocks 140, or show these altered states with a specific condition as a trigger, as shown in the above-described Steps S106 and S108. As a result, the entire movement route of the target device 200 determined by the programming operations, the sequence of the movements and the like can be visually grasped and easily understood.

When the above-described programming operation processing is ended (Yes at Step S110), awaiting state is set in which program generation processing using the programming board 120 and the core unit 160 can be performed.

Then, when the user operates a program execution switch (the batch execution switch 112 or the stepwise execution switch 114) provided on the operation section 162 of the core unit 160 (Step S112), program batch generation and execution processing at Steps S114 to S120 or program step generation and execution processing at Steps S122 to S130 are performed, as shown in FIG. 7 (*a*).

(Program Batch Generation and Execution Processing) At the above-described Step S112, when the user performs an ON operation on the batch execution switch 112 provided on the core unit 160 as shown in FIG. 7 (*a*), program batch generation and execution processing are performed. In the program batch generation and the execution processing, first, the control section 170 of the core unit 160 transmits a control signal to the control section 132 of the programming board 120, and collectively receives input operation information including the indicated position information, the sequential order information, the block position information, the stacking identification information and the height setting information acquired by the above-described programming operation processing from the programming board 120 (Step S114).

Next, the control section 170 collectively generates programs including commands for controlling the operating state of the target device 200, with the input operation information received from the programming board 120 as source codes (Step S116). The programs generated in the control section 170 are stored in the storage area of the storage section 166 of the core unit 160.

Next, the control section 170 transmits the generated programs collectively to the target device 200 via the communication I/F section 168, as shown in FIG. 7 (*a*) (Step S118). Subsequently, by executing the transmitted programs, the target device 200 performs a collective operation of sequentially moving along the movement route on the actual terrain 202 defined based on the height component added to the virtual route and the virtual route extending from the start point Rs to the endpoint Rg determined in the above-described programming operation processing using the programming board 120, as shown in FIG. 7 (*b*) and FIG. 8 (*a*), (*b*) (Step S120). Then, after the collective operation, the series of processing operations related to the programming operations, the program generation, and the execution method shown in the flowchart of FIG. 4 is ended.

In the above-described collective operation, the control section 170 of the core unit 160 receives, as needed, information regarding the execution status (which is a current position and height of the target device 200) of a program from the target device 200 as program execution information via the communication I/F section 168, and transmits it to the control section 132 of the programming board 120 as program execution information. Then, based on the program execution information received from the core unit 160, the control section 132 of the programming board 120 causes an area 102 corresponding to a current position of the target device 200 on the actual terrain 202 or the programming blocks 140 to emit light in a light emission state different from those of the other indicated areas 102 determined by the programming operations or the programming blocks 140, or changes an image displayed thereon so as to alter the area 102 to be visually distinguishable (in FIG. 7 (*b*), FIG. 8 (*a*) and FIG. 8 (*b*), it is drawn with a white color for convenience), as shown in FIG. 7 (*b*), FIG. 8 (*a*) and FIG. 8 (*b*).

In the present embodiment, the core unit 160 performs communication with the target device 200 as required, receives information regarding the execution status of a program in the target device 200, and alters (for example, lights up) an area 102 of the programming board 120 or a programming block 140 corresponding to a current position of the target device 200 based on the program execution information so that the area 102 or the programming block 140 becomes distinguishable. However, the present invention is not limited thereto. For example, a configuration may be adopted in which, based on an elapsed time from the end of the transmission of a program to the target device 200 (that is, without communication being performed with the target device 200), the core unit 160 infers the execution status of the program in the target device 200 and alters an area 102 of the programming board 120 or a programming block 140. In this configuration, the core unit 160 performs communication with the target device 200 at intervals, at each predetermined position, or based on each condition so that a large difference between the inference by the core unit 160 and the actual execution status of the program does not occur.

Here, in a case where the identification alteration section 124 of the programming board 120 and the identification alteration sections 144 of the programming blocks 140 all have light emission sections, the control section 132 of the programming board 120 and the control sections 148 of the programming blocks 140 control their light emission states as the following examples so that the execution status of the program in the target device 200 becomes visually distinguishable and is easily grasped.

First, as shown in the example in FIG. 7 (*a*), the control sections 132 and 148 maintain a state where the light emission sections of all indicated areas 102 corresponding to an entire movement route determined by programming operations and the light emission sections of programming blocks 140 to continuously emit light in a predetermined light emission color and with a predetermined light emission intensity. Then, based on program execution information, the control sections 132 and 148 perform control to cause the light emission section of an area 102 corresponding to the current position of the target device 200 and the light emission section of a programming block 140 corresponding to the current function operation of the target device 200 to emit light in a light emission color different from that of the other indicated areas 102 and programming blocks 140 and with a higher light emission intensity or a different light emission pattern (for example, flashing), as shown in FIG. 7 (b) and FIG. 8 (a), (b).

Also, in another configuration, the control sections 132 and 148 perform control to cause the light emission section of an area 102 corresponding to the current position of the target device 200 and the light emission section of a programming block 140 to emit light in a predetermined light emission color with a predetermined light emission intensity and cause the light emission sections of the other indicated areas 102 and programming blocks 140 not to emit light (the lights are turned off).

In yet another configuration, in all the identification alteration sections 124 of the areas 102 of the programming board 120 and all the identification alteration sections 144 of the programming blocks 140, a first light emission section for expressing a status at the time of programming operation and a second light emission section for expressing a status at the time of program execution are separately provided. Then, in an area 102 corresponding to the current position of the target device 200 and a programming block 140, the control sections 132 and 148 perform control to cause both of the first and second light emission sections to emit light. In the other indicated areas 102 and programming blocks 140, the control sections 132 and 148 perform control to cause only the first light emission sections to emit light.

Also, when an error or a bug occurs in a program being executed in the target device 200, the control sections 132 and 148 perform control such that an area 102 or a programming block 140 where the error or the bug has occurred emit light using a light emission color and a light emission pattern different from those of the above-described normal execution state, based on program execution information received from the target device 200. As a result, the user is notified of the anomaly at the time of the program execution. Note that the error or the bug herein refers to, for example, a case where a position of the target device 200 deviates from the movement route set during the programming operation or a case where the target device 200 collides and falls with an obstacle which had not been expected at the time of programming operations.

(Program Step Generation and Execution Processing)

At the above-described Step S112, when the user performs an ON operation on the stepwise execution switch 114 provided on the core unit 160 as shown in FIG. 9 (a), program step generation and execution processing are performed. In the program step generation and the execution processing, first, the control section 170 of the core unit 160 transmits a control signal to the control section 132 of the programming board 120 and receives, from the programming board 120, the input operation information acquired by the programming operation processing collectively or for each one programming operation (one step) (Step S122).

Next, based on the received input operation information, the control section 170 generates programs including commands for controlling the operating state of the target device 200 collectively or for each one programming operation (Step S124). The programs generated by the control section 170 are stored in the storage area of the storage section 166 of the core unit 160. Note that the "one programming operation" herein refers to an operation of indicating one area 102 or an operation of placing one programming block 140, and the "one step" in the program step generation and the execution processing in the present embodiment refers to a group of "steps" specified by this one operation.

Next, the control section 170 transmits each generated program corresponding to one operation individually to the target device 200 via the communication I/F section 168, as shown in FIG. 9 (a), (Step S126). Then, by executing a transmitted program corresponding to one operation, the target device 200 performs a step operation of moving by an amount equal to one operation along the movement route on the actual terrain 202 defined based on the height component added to the virtual route, or performing a function corresponding to one operation (Step S128).

Here, the control section 170 of the core unit 160 transmits information regarding the program corresponding to one operation transmitted to the target device 200 (that is, information specifying the movement position and height of the target device 200 or the function to be performed by the target device 200) to the control section 132 of the programming board 120 as program execution information. The control section 132 of the programming board 120 causes, based on this program execution information, an area 102 or a programming block 140 corresponding to the current position of the target device 200 on the actual terrain 202 to emit light in a light emission state different from those of the other indicated areas 102 or the programming block 140, or changes an image displayed thereon so as to alter the area 102 to be visually distinguishable (in FIG. 9 (a), it is drawn with a white color for convenience), as shown in FIG. 9 (a).

After the processing operation of Step S128, the control section 170 of the core unit 160 judges whether the step operation performed by the target device 200 at Step S128 corresponds to the last input operation information among the input operation information acquired by the programming operation processing (Step S130). That is, after the target device 200 moves to the end position of the movement route on the actual terrain 202, if one or a plurality of programming blocks 140 has been stacked at this end position, the control section 170 of the core unit 160 judges whether the target device 200 has performed all functions corresponding to these programming blocks 140.

When the control section 170 of the core unit 160 judges that the step operation performed by the target device 200 at Step S128 corresponds to the last input operation information (Yes at Step S130), the programming operations and the series of processing operations related to the program generation and the execution method shown in the flowchart of FIG. 4 are completed. Conversely, when judged that the step operation performed by the target device 200 at Step S128 does not correspond to the last input operation information (No at Step S130), the control section 170 proceeds to the above-described Step S112. At this Step S112, the control section 170 judges whether the user has performed an ON operation on the batch execution switch 112 provided on the core unit 160 or has performed an ON operation on the stepwise execution switch 114.

When judged that an ON operation on the batch execution switch 112 has been performed, the control section 170 of the core unit 160 performs the above-described program batch generation and the execution processing for all of the input operation information not yet subjected to the processing among the input operation information acquired by the programming operation processing (Steps S114 to S120). Then, after operations corresponding to all the input operation information are performed, the programming operations and the series of processing operations related to the program generation and the execution method shown in the flowchart of FIG. 4 are completed. Also, when judged that an ON operation on the stepwise execution switch 114 has been performed, the control section 170 of the core unit 160 performs the program step generation and the execution processing in accordance with the above-described Steps S122 to S130. Note that, in the present embodiment, the series of processing operations shown in FIG. 4 is referred to as "normal mode" for convenience.

As described above, in the present embodiment, the tangible program control device constituted by the programming board 120, the programming block 140s, and the core unit 160 is used, and a horizontal movement component (virtual route) of the movement route of the target device 200 can be determined by programming operations of touching or depressing arbitrary areas 102 on the programming board 120 as instructions. In addition, by a programming operation of placing a programming block 140 on an arbitrary indicated area 102 on the programming board 120, a three-dimensional movement route in the absolute coordinate system can be defined by adding a vertical component in the height direction of the movement route of the target device 200.

Also, in the present embodiment, areas 102 and programming blocks 140 on the programming board 120 which correspond to a movement route of the target device 200 determined during programming operations can be altered to be visually distinguishable from the other areas 102 and programming blocks 140. Also, during the execution of programs generated based on programming operations, or before or after the execution of programs (such as during programming operations), areas 102 and programming blocks 140 corresponding to an operating state of the target device 200 can be altered to be visually distinguishable from the other areas 102 and programming blocks 140.

Thus, according to the present embodiment, even young children such as infants can easily perform programming for determining the movement route of the target device 200 in the three-dimensional space, and easily and intuitively grasp its operation contents and operating state visually. Accordingly, the learning effect of programming can be expected to be improved.

In the above descriptions of the programming operations, the program generation, and the execution method, the configuration has been described in which, after the programming operation processing (Step S110), the user operates a program execution switch (the batch execution switch 112 or the stepwise execution switch 114) provided on the operation section 162 of the core unit 160 (Step S112), and thereby transmits input operation information acquired by the programming operation processing to the core unit 160 from the programming board 120 (Step S114 and Step S122). However, the present invention is not limited thereto. For example, a configuration may be adopted in which, when input operation information is acquired in the programming board 120 during the programming operation processing, this input operation information is transmitted at any time, at predetermined timing or periodically.

Also, in the above descriptions of the programming operations, the program generation, and the execution method, the method has been described in which a movement route of the target device 200 is determined by areas 102 of the programming area 104 corresponding to the start point of the movement route to the end point being sequentially indicated. However, the present invention is not limited thereto. For example, a configuration may be adopted in which, when two areas 102 that are not adjacent to each other are temporally successively indicated in programming operations, interpolation processing is performed in which non-indicated areas 102 between these areas 102 are automatically set as indicated areas so as to determine a movement route.

More specifically, a configuration may be adopted whereby when two areas 102 that are not adjacent to each other are successively indicated in the programming area 104, interpolation processing may be set serving as the shortest distance or shortest time between the areas 102. Also, a configuration may be adopted whereby, when there is a plurality of routes and predetermined conditions (such as an optimal cost, an essential passing point and the like) for determining a movement route, an optimal route may be determined by taking these conditions into consideration. Here, the cost is a condition for setting an optimal route, which is an expense or total cost incurred when passing through each area 102 and setting the route, and the associated individual cost of each area 102 is set in advance. Such interpolation processing may be, for example, incorporated in advance into the programming operation processing that is performed by the control section 132 of the programming board 120. Alternatively, for example, an interpolation processing function may be turned on or turned off by operating an interpolation switch, which is not shown in the drawings.

In this embodiment, as a method for setting the position of the target device 200 in the height direction, a method has been described in which a change amount in the height direction calculated based on the unit change amount of height setting information set in each programming block 140 and the number of stacked programming blocks 140 in stacking identification information is added to (subtracted from) a height at a position corresponding to an immediately preceding area 102 on a virtual route, whereby a relative height is set or an absolute position in the height direction is directly set. However, the present invention is not limited thereto.

For example, a method may be adopted in which the time change amount of a height in each area where a programming block 140 has been placed is set as height setting information, and a height is changed in accordance with time elapsed with this area as a starting point. In this method, after the starting area, every time the process is moved to an adjacent area, for example, the position in the height direction is set to increase (rise) by 10 cm.

Also, another configuration can be adopted in which a method is used which sets a branch condition to each area where a programming block 140 has been placed as height setting information, and change a height changing amount according to this branch condition. In this method, for example, when the position in the height direction exceeds 100 cm in the current area, the position in the height direction is set to reduced (lowered) by 10 cm in the next area, and when the position in the height direction does not exceed 100 cm, the position in the height direction is set to increase (rise) by 10 cm in the next area.

Also, another configuration can be adopted in which a method is used which changes a height in accordance with an event that occurs during the movement operation of the target device 200. In this method, for example, when a clap sound is detected once while the target device 200 is moving along a movement route, its position in the height direction is set to be increased (rise) by 10 cm. When a clap sound is detected twice, its position in the height direction is set to be reduced (lowered) by 10 cm.

In the above-described embodiment, programming operations are performed with the guide sheet 180 being attached on the programming area 104 of the programming board 120, and the target device 200 is moved on the actual terrain 202 corresponding to an image of the guide sheet 180 is shown, as shown in FIG. 5 to FIG. 10. However, the present invention is not limited thereto, and the following configuration may be adopted.

FIG. 11 and FIG. 12 are schematic diagrams showing a configuration example of the programming educational device (programming device) according to the present embodiment which does not include any guide sheet. Note that, here, descriptions of sections that are the same as those of this embodiment are simplified.

That is, in the present embodiment, the programming educational device may be configured such that programming operations are performed without the guide sheet 180. In this structure, as shown in FIG. 11 (a), while imagining a movement route of the target device 200 in the three-dimensional space, the user indicates areas 102 of the programming area 104 on the programming board 120 having no guide sheet by directly touching or depressing them, and thereby determines a movement component (virtual route) in the horizontal direction among movement routes of the target device 200. In addition, by placing one or a plurality of programming blocks 140 on the arbitrary indicated area 102 of the programming area 104, the user determines a movement route of the target device 200 in the three-dimensional space. In the drawing, the first area 102 of the programming area 104 indicated by the user corresponds to the start point of the movement route of the target device 200 and the last area 102 corresponds to the end point of the movement route.

Also, in the structure having no guide sheet 180, for example, a structure may be adopted in which an image similar to that on the above-described guide sheet 180 is directly drawn on the upper surface of the programming area 104 of the programming board 120. Also, a configuration may be adopted in which an image GP which is similar to that on the above-described guide sheet 180 or supports or guides programming operations is displayed on the light emission sections or display sections provided on the areas 102 as the identification alteration sections 124 or on the luminescent panel or display panel provided to be shared in the entire programming area 104, as shown in FIG. 11 (b). In the configuration shown in FIG. 11 (b), by the data of the image GP or the like displayed by use of the identification alteration sections 124 being rewritten, the image GP displayed on the programming area 104 can be changed as required.

Moreover, in the structure having no guide sheet 180, for example, a structure may be adopted in which, as the instruction detection sections 122 provided corresponding to the areas 102 of the programming board 120, push switches and the like may be used which has a switch mechanism where switching between an ON state and an OFF state switches at every depression operation by a user, and the height at which its upper surface is located in the ON state is changed in relation to a height (reference height) where the upper surface of the programming area 104 is located. More specifically, by a first depression operation, each push switch enters a state (concave state) where its upper surface is positioned lower than the reference height so as to be electrically tuned on. Then, by a second depression operation, this push button reverts so that its upper surface is at the height equal to the reference height, and thereby electrically turned off, as shown in FIG. 12 (a). Note that the structure of each push switch is not limited to the above-described structure where its upper surface is depressed (changes to concave state) in response to a depression operation that switches to the ON state. For example, a structure may be adopted in which its upper surface protrudes (changes convex state) in response to a depression operation so that it switches to the ON state, as shown in FIG. 12 (b). By this structure where each area 102 indicated by the user is visually distinguishable, the progress of programming operations can be easily grasped. That is, in the structure shown in FIG. 12, the instruction detection sections 122 also function as the identification alteration sections 124. Note that, in this structure as well, the areas 102 of the programming board 120 may include light emission sections or display sections as the identification alteration sections 124. In that case, by the instruction detection sections 122, each indicated area 102 changes to the concave state or the convex state so as to be electrically turned on, and emits light in a predetermined light emission state or changes a displayed image.

In this embodiment, the structure has been described in which the programming board 120 and the core unit 160 are provided separately, and the transmission and reception of input operation information therebetween and the supply of driving power therebetween are performed via the non-contact or contact type interfaces, as shown FIG. 1. However, the present invention is not limited thereto, and the programming board 120 and the core unit 160 may be integrally formed.

FIG. 13 is a schematic diagram showing a structure example where the programming board and the core unit have been integrally formed in the programming educational device (programming device) according to the present embodiment. Here, FIG. 13 (a) is a schematic diagram showing a structure where the programming board and the core unit have been integrally formed, and FIG. 13 (b) is a function block diagram showing a configuration example that is applied in the programming board of the present embodiment. Note that, here, descriptions of sections that are the same as those of the above-described embodiment are simplified.

In the structure where the programming board and the core unit have been integrated formed, for example, the various types of switches on the operation section 162 of the core unit 160 shown in the above-described embodiment have been arranged around the programming area 104 of the programming board 120, as shown in FIG. 13 (a). This structure has a configuration that actualizes the above-described functions of the programming board 120 and the unit 160, as shown in FIG. 13 (b).

A storage section 129 herein has functions equivalent those of the storage section 128 of the programming board 120 and the storage section 166 of the core unit 160 shown in the above-described embodiment. That is, this storage section 129 stores in a predetermined storage area input operation information including indicated position information, sequential order information, block position information, stacking identification information and height setting information acquired by the instruction detection sections 122 and the block I/F sections 126, and stores in another storage area programs generated by a control section 133 based on the input operation information. Moreover, this storage section 129 may store a program that is used to generate, in the control section 133, programs for controlling the operating state of the target device 200 based on input operation information, a program for controlling the operation of each section of the programming board 120, and various types of other information. That is, the storage section 128 has a RAM and a ROM.

Also, the control section 133 is a processor of a computer which controls the operation of each section of the programming board 120 having the instruction detection sections 122, the identification alteration sections 124, the block I/F sections 126, the storage section 129, the operation section 162, the communication I/F section 168 and the power supply section 172, and has functions equivalent those of the control section 132 of the programming board 120 and the control section 170 of the core unit 160 shown in the above-described embodiment. That is, when the user's instructions performed on areas 102 in the programming area 104 are detected, or when a state is detected in which programming blocks 140 have been placed on indicated areas, the control section 133 stores acquired input operation in the storage area of the storage section 129. Also, the control section 133 generates programs for controlling the operating state of the target device 200 based on input operation information, and transmits the generated programs to the target device 200 in response to a switch operation on the operation section 162 so as to control the operating state of the target device 200.

Note that, in this embodiment, the external I/F sections 130 and 164 shown in FIG. 2 which is used for communicating between the programming board 120 and the core unit 160 are omitted. Also, the control section 133 and the storage section 129 may be partially or entirely shared by the programming board 120 and the core unit 160 shown in FIG. 2. Also, in this embodiment, each section of the programming board 120 and the core unit 160 shown in FIG. 2 is operated by electric power supplied from the single power supply section 172. Moreover, in this embodiment as well, the guide sheet 180 for supporting and guiding programming operations may be attached on the programming area 104 as with the above-described, but is not necessarily required to be attached.

By the programming board 120 and the core unit 160 being integrally formed as described above, programming operations, program generation, and the control of the operating state of the target device 200 can be performed by the programming board 120 alone. Here, by the transmission and reception of various types of information being omitted or the number of times of storing or reading in or from the storage section 129 being reduced in each processing operation, the entire processing can be simplified in this embodiment. Also, in this embodiment, the number of the parts constituting the program control device 100 can be reduced, and the supply of driving power to the program control device 100 can be stably performed.

In this embodiment, when the target device 200 is to be operated in the three-dimensional space, height setting information for setting the position of the target device 200 in the height direction is stored in advance in each programming block 140, and one or a plurality of programming blocks 140 are placed on areas 102 to be a virtual route. However, the present invention is not limited thereto. For example, a configuration may be adopted in which function information for causing the target device 200 to execute a specific function operation is set in a programming block 140, and the target device 200 is caused to execute the set function operation at a position where this programming block 140 has been placed. That is, as with the above-described height setting information for setting the position of the target device 200 in the height direction, the function information set in the programming block 140 is acquired as one piece of input operation information by the programming board 120 by the programming block 140 being placed, and a program having an instruction to cause the target device 200 to execute the function operation based on the function information is generated in the core unit 160.

Here, as the function operation to be performed by the target device 200, a specific function operation without any movement between areas 102 to be virtual routes, that is, a so-called action is executed. Specifically, as the function operation, for example, an operation to control a light emission section to emit light in a predetermined light emission state, an operation to change an image displayed on a display section, an operation to control an audio section to emit a predetermined sound or a musical tone, an operation to control the vibration section to vibrate the housing of the target device 200 with a predetermined pattern, an operation to control the target device 200 to rotate (turn) or jump at a current position, an operation to control an imaging section to capture an image outside the target device 200, an operation to detect the surrounding area of the target device 200 by various sensors such as a voice sensor and an illuminance sensor, and the like. Accordingly, in order to actualize the above-described function operations, a light emission section, an audio section, a vibration section, an imaging section, various sensors, and the like are provided in advance in the target device 200. The control section of the target device 200 moves the target device 200 to a position and a height corresponding to an area 102 where a programming block 140 having a specific function operation set therein has been placed in accordance with programs stored in the storage section and then controls one of the above-described function sections so as to cause the target device 200 to perform the function operation set in the programming block 140 at that position.

In addition to the function operation corresponding to the above action, the function operation to be executed by the target device 200 may include "conditional branch" in which the operating state of the target device 200 changes in accordance with a preset condition, or "repetition" in which the target device 200 repeatedly moves between preset areas 102, or "function" that is a collection of a plurality of function operations, or "event processing" that defines operations for events that occur while the target device 200 is moving or the like.

The above-described function operations may be executed alone or in combination based on function information set in a programming block 140, at a position on a movement route corresponding to an area where the programming block 140 has been placed. Also, a configuration may be adopted in which the height setting information of the present embodiment for setting the position of the target device 200 in the height direction and the above-described function information are set in combination in a programming block 140, and the corresponding specific function operation is executed while the movement operation of the target device 200 in the three-dimensional space is being controlled.

Also, in the above-described embodiment, as the core unit 160, the dedicated control device is used which is connected to the programming board 120 via a noncontact or contact type interface, as shown in FIG. 1. However, the present invention is not limited thereto, and a configuration may be adopted in which a general-purpose mobile terminal, such as a smartphone or a tablet, is used as the core unit 160. That is, any general-purpose mobile terminal which is commercially available in recent years can function as the operation section 162, the external I/F part 164, the storage section 166, the communication I/F section 168, the control section 170, and the power supply section 172 included in the core unit 160. Accordingly, by dedicated application software (compiler) for generating programs for controlling the operating state of the target device 200 being installed into such a mobile terminal, this general-purpose mobile terminal can be used as the core unit 160. Here, in the case where a general-purpose mobile terminal is used as the core unit 160, software for setting various types of parameters for the programming board 120 or the target device 200, software for performing code conversion of the above-described input operation information into a general-purpose language (text) and the like may be installed in addition to the compiler. Note that the above-described various types of parameters for the programming board 120 or the target device 200 are setting items capable of changing the detection sensitivity of each instruction detection section 122, the light emission status of each identification alteration section 124, an image displayed on each identification alteration section 124, the transmission and reception method of each block I/F section 126 and the like in the programming board 120, or the movement speed of the driving section, the light emission status, sound emission status, and vibration status of the function section, the communication method of the communication I/F section and the like in the target device 200.

Modification Examples

Next, a modification example of the programming educational device including the program control device according to the present embodiment is described.

Figure 14:
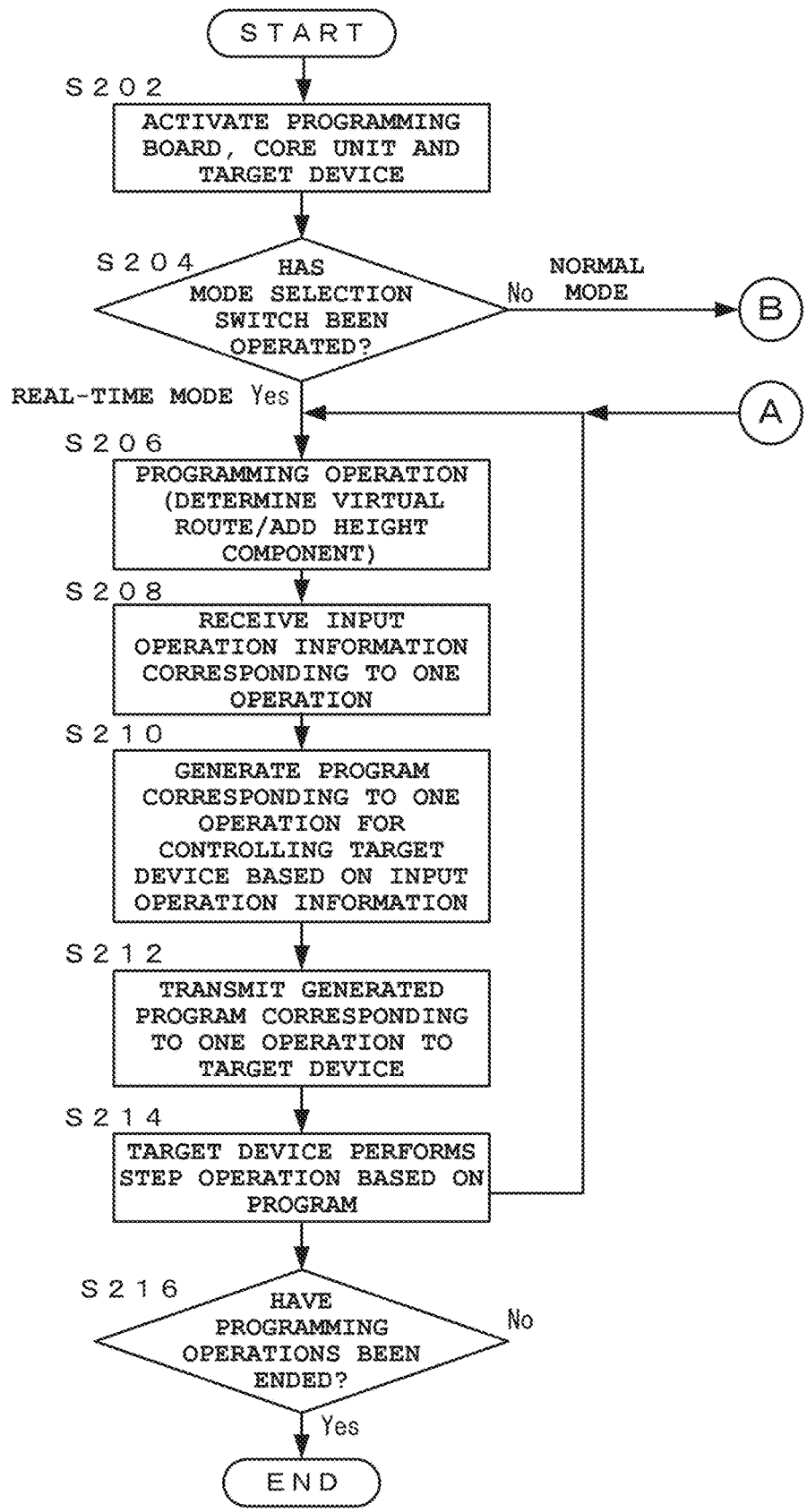
FIG. 14 is a flowchart showing a modification example (real-time mode) of the procedure including the programming operations, the program generation, and the execution method in the programming educational device according to the present embodiment.
Figure 15:
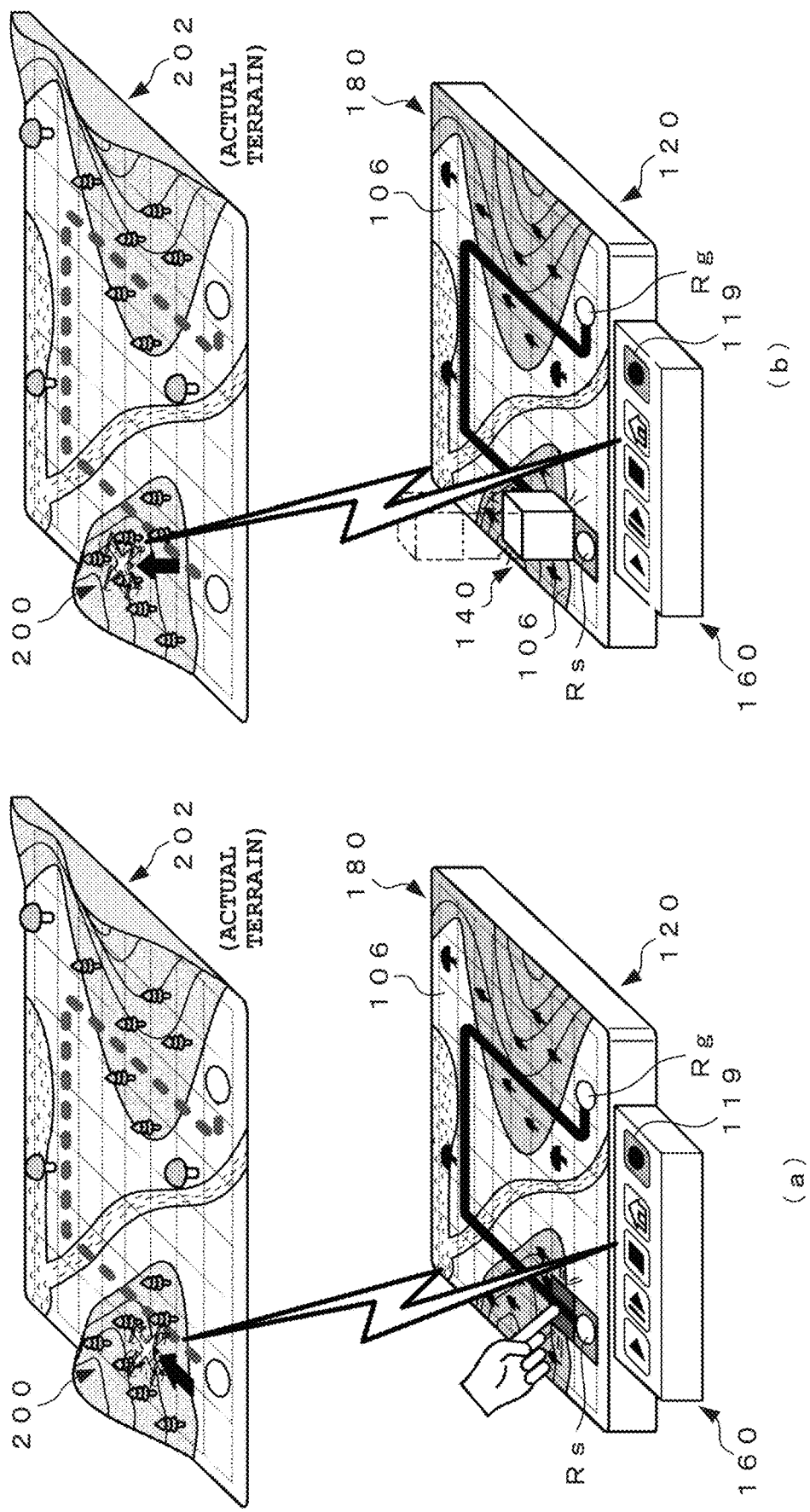
FIG. 15 is a first schematic diagram for describing programming operation processing, program generation, and execution processing applied in the modification example.
Figure 16:
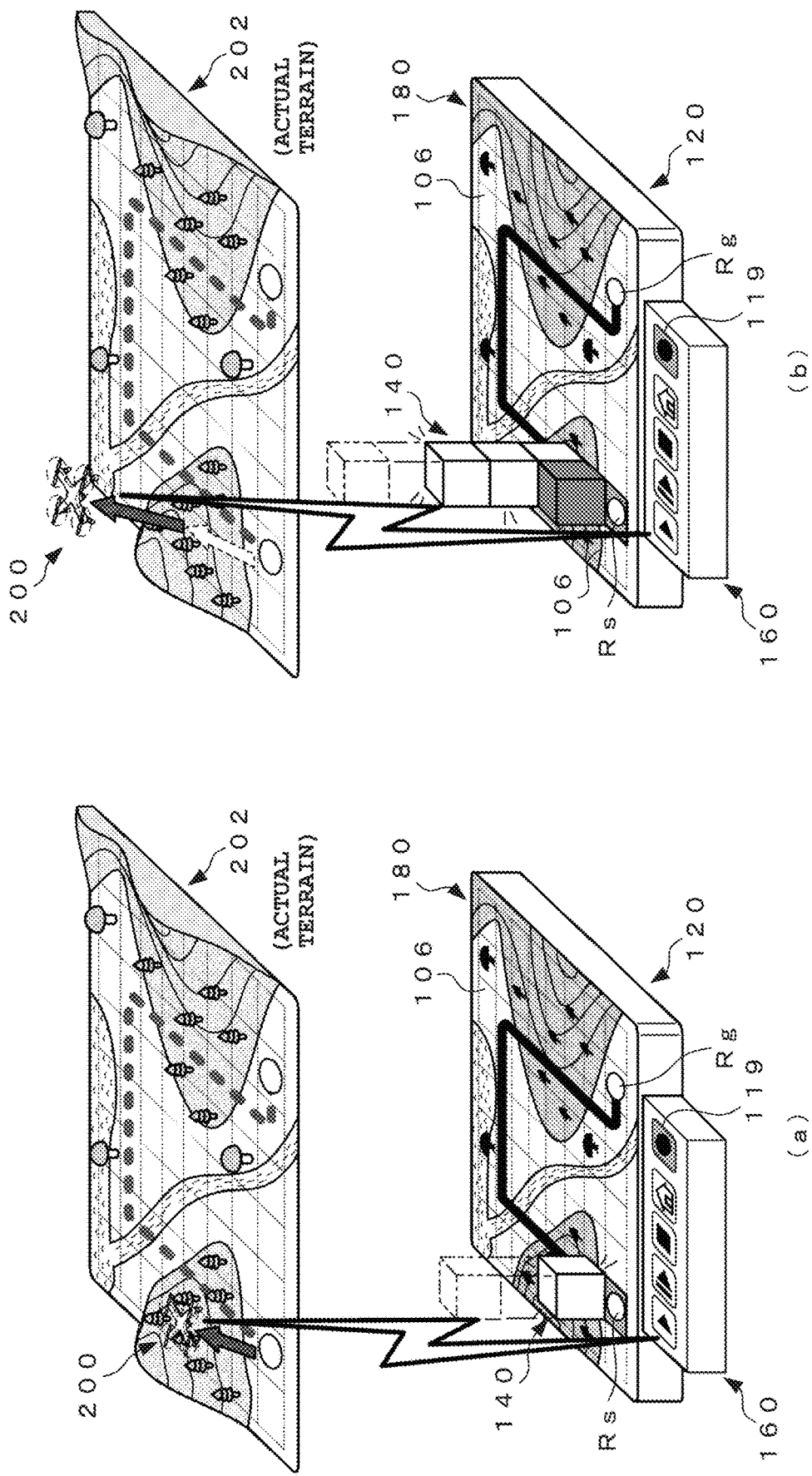
FIG. 16 is a second schematic diagram for describing the program generation and the execution processing applied in the modification embodiment.

FIG. 14 is a flowchart showing a modification example (real-time mode) of the procedure including the programming operations, the program generation, and the execution method in the programming educational device according to the present embodiment. FIG. 15 and FIG. 16 are schematic diagrams for describing programming operation processing, program generation and execution processing applied in the modification example. Here, descriptions of sections that are the same as those of the above-described embodiment are simplified.

In the above descriptions of the programming operations, in the programming educational device according to the present embodiment, the normal mode has been described in which, in the programming operation processing, the entire movement route of the target device 200 in the three-dimensional space is determined, and then the program generation processing and the program execution processing are performed. However, the modification example has a real-time mode in which, in the programming operation processing, a program corresponding to one operation is generated and transmitted to the target device 200 for execution every time an input operation corresponding to one operation is performed, in addition to the normal mode. Here, the user selects an arbitrary mode for learning programming.

(Programming Operation Processing)

In the programming operation processing in the programming educational device according to the modification example, first, the user connects the programming board 120 and the core unit 160 to each other, and activates the program control device 100 and the target device 200 (Step S202), as shown in the flowchart of FIG. 14. Also, the user attaches the guide sheet 180 to the programming area 104 of the programming board 120.

Next, the control section 170 of the core unit 160 judges whether or not the user has operated a mode selection switch 119 so as to set the normal mode or the real-time mode (Step S204). The mode selection switch 119 herein is, for example, provided on the operation section 162 of the core unit 160 as shown in FIG. 15 (*a*), and is used to select between the processing operations of the normal mode described in the above embodiment and the later-described processing operations of the real-time mode. For example, a push switch or a slide switch is applied as this mode selection switch 119. In a structure where a push switch has been applied as the mode selection switch 119, when the control section 170 judges that the user has not depressed the mode selection switch 119 (No at Step S204), the normal mode, which has already been set by initial setting (default), is maintained. When judged that the user has depressed the mode selection switch 119 (Yes at Step S204), the control section 170 switches the normal mode to the real-time mode so as to set the real-time mode. Note that in a case where the mode selection switch 119 is depressed again in the set real-time mode, the real-time mode is switched to the normal mode and the normal mode is set again. That is, every time the mode selection switch 119 is depressed, switching between the normal mode and the real-time mode is performed.

When judged that the normal mode has been set by the mode selection switch 119, the control section 170 performs the processing operations of Step S106 and the following steps in the flowchart shown in FIG. 4 in the above-described embodiment. Conversely, when judged that the real-time mode has been set by the mode selection switch 119, the control section 170 performs processing operations of Step S206 and the following steps described below.

Note that the processing operations related to the mode switching and setting at Step S204 are similarly performed in the flowchart shown in FIG. 4 in the above-described embodiment. At Step S104, when the user has not depressed the mode selection switch 119, the normal mode set by initial setting is maintained, and the processing operations of Step S106 and the following steps are performed. When the user depresses the mode selection switch 119 and switches the normal mode to the real-time mode, the processing operations of Step S206 and the following steps are performed.

When the real time mode is set, the control section 170 performs programming operation processing where the user determines a movement route of the target device 200 in the three-dimensional space, by using the programming board 120 having the guide sheet 180 and a programming block 140 (Step S206).

More specifically, in programming operation processing for determining a movement route of the target device 200, the user refers to an image shown on the guide sheet 180 attached to the programming board 120, and touches or depresses one partition 106 (that is, one area 102 to be a virtual route) corresponding to a movement route where the target device 200 is operated by an amount equal to one operation so as to indicate this partition 106, as shown in FIG. 15 (*a*). Also, when setting the position of the target device 200 in the height direction, the user sets one or a plurality of programming blocks 140 having height setting information set therein on this one partition 106 corresponding to the movement route, as shown in FIG. 15 (*b*).

When the user performs this programming operation, the one area 102 of the programming area 104 corresponding to the above-described partition 106 is indicated via the guide sheet 180 and a virtual route corresponding to the one operation for the movement route of the target device 200 is determined as shown in FIG. 15 (*a*). Also, the one area 102 where the programming block 140 has been placed is indicated, and the height component is added to the virtual route as shown in FIG. 15 (*b*). Here, the control section 132 of the programming board 120 acquires the indicated position information of the one indicated area 102 detected by the corresponding instruction detection section 122 and its sequential order information, or the block position information, height setting information and stacking identification information of the placed programming block 140, and stores them in the storage area of the storage section 128. Also, the control section 132 causes the identification alteration section 124 of the indicated area 102 or the identification alteration section 144 of the programming block 140 to emit light in a predetermined light emission state or to alter a displayed image so as to be visually distinguishable (shown using a dark halftone color in FIG. 15 (*a*) for convenience of description and shown using a white color in FIG. 15 (*b*) for convenience of description).

In this modification example, operation processing (FIG. 15 (*a*)) for determining a virtual route corresponding to a horizontal movement component of the target device 200 and operation processing (FIG. 15 (*b*)) for adding a height component to this virtual route are individually performed. However, the present invention is not limited thereto. For example, a method may be adopted in which, in a state where one partition 106 (that is, an area 102 to be a virtual route) corresponding to a movement route has not been indicated, one or a polarity of programming blocks 140 is placed on this partition 106 (or the area 102), whereby processing for determining the area 102 corresponding to the partition 106 as a virtual route and processing for adding a height component to the area 102 are collectively performed, as shown in FIG. 16 (*a*) and FIG. 16 (*b*). In particular, in the real-time mode, a programming operation using the programming board 120 and programming blocks 140 and the operating state of the target device 200 are linked in real time. Accordingly, by applying the above described collective processing method, it is possible to prevent an error or an accident that the target device 200 such as a drone collides with an unexpected obstacle or the like. Note that this technique can also be favorably applied in the normal mode shown in the above-described embodiment.

(Program Generation and Execution Processing)

When the input operation information having the indicated position information regarding the one operation and the sequential order information, or the block position information, the height setting information, and the stacking identification information are acquired in the programming operation processing, a control signal is transmitted to the control section 170 of the core unit 160 from the control section 132, and the program generation and the execution processing is performed. More specifically, the control section 170 of the core unit 160 receives input operation information acquired in the programming board 120 by the programming operation processing (Step S208). This input operation information is received for each one programming operation (step).

Next, based on the received input operation information corresponding to the one operation, the control section 170 of the core unit 160 generates a program corresponding to the one operation which includes a command for controlling the operating state (movement or function operation) of the target device 200 (Step S210).

Then, the control section 170 transmits the generated program corresponding to the one operation to the target device 200 (Step S212), so that the program corresponding to the one operation is executed in the target device 200 and a step operation is performed in which the target device 200 is horizontally or vertically moved along the movement route on the actual terrain 202 by an amount equal to the one operation (Step S214), as shown in FIG. 15 (*a*) and FIG. 15 (*b*).

The above-described programming operation processing, program generation, and execution processing for controlling the operating state of the target device 200 are repeatedly performed for each operation until the target device 200 is moved to a movement route endpoint on the actual terrain 202 and the programming operations are completed (Step S216), as shown in FIG. 15 (*a*) and FIG. 15 (*b*) or FIG. 16 (*a*) and FIG. 16 (*b*). Here, the control section 170 makes a judgment that the programming operations have been completed, in response to the reception of an instruction (touch or depression) with respect to one partition 106 corresponding to the end point (goal) Rg. Also, for example, the control section 170 may make this judgment that the programming operations have been completed when a depression operation on the execution stop switch 116 is received at arbitrary timing during the programming operations.

As described above, in this modification example, switching between the normal mode and the real time mode is arbitrarily performed, whereby operation contents in the programming operation processing for controlling the operating state of the target device 200 and the execution statuses of programs can be visually grasped collectively or for each operation and therefore can be easily and intuitively understood from many sides. As a result of this configuration, the learning effect of programming can be expected to be improved.

Second Embodiment

Next, a second embodiment of the programming education device according to the present invention is described with reference to the drawings.

FIG. 17 is a schematic diagram showing the second embodiment of the programming educational device where the programming device according to the present invention has been applied. Here, descriptions of sections that are the same as those of the above-described first embodiment are simplified.

In the programming educational device according to the above-described first embodiment, the position of the target device 200 in the height direction is set using programming blocks 140 placed on the programming board 120. In the second embodiment, the position of the target device 200 in the height direction is set without using any programming blocks.

First, in a case where programming operations are performed without using the programming blocks 140 (that is, when programming operations using the programming blocks 140 are omitted) in the first embodiment, only a virtual route corresponding to a horizontal movement component in a movement route of the target device 200 is determined, and only the movement of the target device 200 on a horizontal plane is controlled (that is, its position in the height direction is stable and is not changed).

On the other hand, in the second embodiment, in a programming operation using the programming board 120, the position of the target device 200 in the height direction is set by using, for example, the detection function of the instruction detection section 122 provided in each area 102 on the programming board 120 without using the programming blocks 140. More specifically, each instruction detection section 122 provided in the areas 102 of the programming area 104 detects whether the user's instruction operation (touching or depressing) has been performed on the corresponding area 102 and a method or a status of this instruction, by using its touch sensor or push switch. In the storage area of the storage section 128 of the programming board 120, height setting information has been stored which has a unit change amount for setting the position of the target device 200 in the height direction in accordance with the user's instruction method and status that are detected by the instruction detection sections 122.

Here, each instruction method and status that is detected by the instruction detection sections 122 are the number of times the user has touched or depressed on an area 102, the duration time the user has touched or depressed, the degree of force applied by the user, or types of input operations and gesture operations and the like. Based on the detection result (number of times, duration time or the like), the control section 132 of the programming board 120 calculates the amount of change in the height direction of the target device 200 by setting the unit change amount of the height setting information to an integral multiple or a proportional multiple.

For example, the height of the target device 200 is set to be increased stepwise by 10 cm at a time in accordance with the number of times the user has touched or pressed the touch sensor or push switch provided on the instruction detection section 122 in the area 102, as shown in FIG. 17 (*a*). Also, for example, the height of the target device 200 is set to be continuously increased by 10 cm per second in accordance with the duration time when the touch sensor or the push switch is touched or pressed, as shown in FIG. 17 (*b*). Here, the amount of change (10 cm) in the height direction for every one time or every second of each touch or press corresponds to the unit change amount of the height setting information described in the first embodiment. In addition, a method can be adopted which performs toggle switching (for example, a method of increasing the amount of changes in a preset range according to the number of times or the duration time the user has touched or pressed, returning to the minimum value when reaching the maximum value, and increasing again) on the amount of change in the height direction within a preset numerical range.

Also, as another configuration, the amount of change in the height direction set in advance (for example, 10 cm for a double click operation, 30 cm for gesture action "A", 50 cm for gesture action "B", and the like.) may be applied based on the degree of force when touching or pressing the touch sensor or push switch of the instruction detection section 122. The amount of change in the height direction of the target device 200 calculated or applied by the control section 132 is stored in the storage section 128 in association with the indicated position information of the indicated area 102.

Note that a method may be adopted in which the amount of change in the height direction set in one area 102 is set to an initial value (initial height) for setting the position of the target device 200 in the height direction, in the next area 102 that has a temporally continuous order relationship. Also, the degree of the amount of change in the height direction (unit change amount), the speed of change, the manner of change, the numerical range that defines the change amount or the like are not limited to fixed values stored in advance. For example, the setting may be changed by operating a height change amount selection switch (omitted in the drawing) provided on the programming board 120 and the like, or by application software of a mobile terminal (omitted in the drawing) such as a tablet connected to the programming board 120 or the core unit 160.

In this embodiment as well, in a programming operation using the programming board 120, areas 102 of the programming area 104 are indicated by the user, whereby a virtual rote corresponding to a horizontal movement component in a movement rote of the target device 200 is determined. Here, the control section 132 controls the identification alteration sections 124 of each indicated area 102 to be visually distinguishable by causing the identification alteration sections 124 of each indicated area 102 to emit light with a predetermined light emission state or by changing displayed images (shown using a halftone color in FIG. 17 (*a*) and FIG. 17 (*b*) for convenience of description). Also, among the plurality of indicated areas 102 serving as the virtual route, an area 102 for setting the position of the target device 200 in the height direction is indicated by the user by the above-described instruction method and instruction state, so that a height component is added to the virtual route. Here, the control section 132 controls the identification alteration sections 124 of each indicated area 102 to be visually distinguishable by causing them to emit light with a predetermined light emission state, or by changing displayed images in accordance with the set amount of change in the height direction.

Here, in a case the identification alteration sections 124 has a light emission section such as a single color LED and the like, for example, the control section 132 decreases the emission intensity when the amount of change in the height direction is smaller (or the absolute position in the height direction is located at a lower point), and increases the emission intensity when the amount of change is larger (or the absolute position in the height direction is located at a higher point). In a case where the identification alteration sections 124 has a light emission section such as a multicolor LED and the like, for example, the control section 132 emits light with a wavelength on the blue light side when the amount of change in the height direction is smaller, and emits light with a wavelength on the red light side when the amount of change is larger (in FIG. 17 (*a*) and FIG. 17 (*b*), an area 102 where the amount of change in the height direction is larger is drawn with a darker halftone color for convenience).

As described above, in the present embodiment, height components in the vertical direction of a moving route of the target device 200 are defined by instruction methods and instruction states when arbitrary areas 102 on the programming board 120 are touched or pressed without any programming blocks, whereby a three-dimensional movement route in an absolute coordinate system can be determined. In addition, areas 102 on the programming board 120 corresponding to a movement route of the target device 200 determined during programming operations and areas 102 with added height components can be easily and intuitively grasped visually. Accordingly, programming for determining a movement route of the target device 200 in the three-dimensional space can be easily performed, and the learning effects of programming can be expected to be improved.

Third Embodiment

Next, a third embodiment of the programming education device according to the present invention will be described with reference to the drawings.

FIG. 18 is a schematic diagram showing the third embodiment of the programming educational device where the programming device according to the present invention has been applied. Here, descriptions of sections that are the same as those of the above-described first or second embodiment are simplified.

In the programming educational device according to the above-described first embodiment, the position of the target device 200 in the height direction is set using programming blocks 140 placed on the programming board 120. In the third embodiment, as with the above-described second embodiment, the position of the target device 200 in the height direction is set without using any programming blocks.

In the third embodiment, the instruction detection section 122 of each area 102 of the programming board 120 has a push switch and, in programming operations, the protrusion amount of a panel member 108 provided in each area 102 of the programming board 120 is arbitrarily set, whereby the position of the target device 200 in the height direction is set based on the protrusion amount, as shown in FIG. 8 (*a*).

Here, each panel member 108 is an upper surface panel that constitutes an area 102 of the programming area 104 and also serves as an on/off button for the push switch of the corresponding instruction detection section 122. For example, the push switches applied to the instruction detection sections 122 are set such that, when no instruction has been given to the instruction detection sections 122 by the user and therefore no panel member 108 has been depressed, the upper surface of the panel member 108 of each area 102 is flush with the upper surface of the programming area 104 which is a reference height (left drawing in FIG. 18 (*b*)), as shown in FIG. 18 (*b*).

When an area 102 is indicated by the user, the panel member 108 of the push switch in this area 102 is depressed and temporarily retracted. Then, when the pressing operation by the user is released, the panel member 108 protrudes above the reference height (center drawing in FIG. 18 (*b*)). Here, indicated position information and sequential order information are acquired by the instruction detection section 122 detecting the user's instruction to this area 102. In addition, in the present embodiment as well, the identification alteration section 124 of the indicated area 102 to be a virtual route is caused to emit light in a predetermined light emission state or a displayed image is changed.

Then, when the user pulls up the panel member 108 of the push switch of the indicated area 102 protruding above the reference height to an arbitrary height, the position of the target apparatus 200 in the height direction is set (right drawing in FIG. 18 (*b*)). Here, when the panel member 108 of the push switch is being pulled up, the instruction detection section 122 detects the protrusion amount of the panel member 108 continuously or stepwise. This protrusion amount is acquired as height setting information for setting the position of the target device 200 in the height direction. Also, in the core unit 160, the protrusion amount of the panel member 108 acquired as height setting information and numerical values indicating a unit change amount and an absolute position for setting the position of the target device 200 in the height direction are stored in association with each other.

As described above, in the present embodiment, by a programming operation in which the user presses a push switch in an arbitrary area 102 of the programming area 104 and raises the panel member 108 protruding above the reference height to an arbitrary height, the area 102 indicated by the user enters a visually distinguishable state, and the position of the target device 200 in the height direction which corresponds to this area 102 is set.

Thus, according to the present embodiment, programming for determining the movement route of the target device 200 in the three-dimensional space can be easily performed, and operation contents and operating states can be grasped easily, intuitively and visually. Accordingly, the learning effects of programming can be expected to be improved.

In each of the above-described embodiments, as the target device 200, an object that moves in three-dimensional space such as a drone has been described. However, the present invention is not limited thereto. That is, the present invention can also be applied to programming learning for controlling a three-dimensional object movement in which, in addition to a movement in two-dimensional space, a movement based on a continuous or stepwise parameter change related to another dimension is taken as a third dimensional movement. In this case, each instruction detection section 122 and each block I/F section 126 function as a parameter value reception section, and each programming block 140 functions as a parameter value instruction section.

Specifically, the following control can be applied as a target.

The movement control of a movable robot having a variable body such as a balloon whose shape continuously changes, in two-dimensional space, and the control of the size (expansion amount) of the balloon and the like.

The movement control of a movable robot having a light emission section in two-dimensional space, and the control of changes in the light emission color (hue) and light emission intensity of the light emission section.

The movement control of a movable robot having an audio section in two-dimensional space, and the control of the volume and tone (frequency) of the audio section. For example, the control of the volume when moving while playing music with a speaker, or the control of the frequency of sound in a case where one sound is generated each time the movable robot moves to another area.

Movement control in two-dimensional space, and movement speed control. For example, the control of movement speed in a current area, by which the length of time to pass through this area is increased by a slow speed being set.

The movement control of a movable robot having a jump mechanism in two-dimensional space, and the height control of its jump.

The movement control of a movable robot having an object launching mechanism in two-dimensional space, and the control of the target height and distance of a launched object.

In each of above-described embodiments, the programming educational device for young children such as infants has been described. However, the present invention is not limited thereto. Since the present invention has the feature that the contents of operations and the operating state of the target device can be grasped and understood through sight and tangible operations, the present invention may be targeted for programming beginners, people who need rehabilitation for body function recovery and the like.

The present invention is not limited to each of the above-stated embodiments, which can be variously modified without departing from the essential points in the execution phase. Furthermore, an invention with a variety of steps is included in each of the above-stated embodiments, and various inventions may be extracted with a suitable combination of the disclosed plurality of constituent features. For example, even if some constituent features are eliminated from the overall constituent features indicated in each embodiment or a configuration is devised from several constituent features that are combined differently, the invention described in the problems to be solved by the invention can be solved. When the effect described in the effect of the invention can be acquired, a configuration with these constituent features that were eliminated or combined can be extracted as an invention.

The invention claimed is:

1. A programming device comprising:
    a programming board which is a tangible object that can be directly and physically touched in real space, and which includes:
        a planar shape indication section which receives at least one first user operation for indicating a planar shape by specifying two or more portions among a plurality of portions arranged at different positions in a planar direction of the planar shape indication section; and
        a height reception section which receives at least one second user operation for indicating a height that is a position in a direction intersecting with a plane of the planar shape or a displacement amount of the height in association with a portion of any of the two or more portions;
    one or more height indication sections each of which indicates a height in the intersecting direction or a displacement amount of the height, and each of which is a tangible object that can be directly and physically touched in real space and is structured to be stackable on the programming board by a user and detected by the programming board when stacked thereon; and
    a hardware processor which generates a command list for moving a control target section along a three-dimensional shape indicated by the planar shape indication section and the height reception section,
    wherein the height reception section is provided on any of the portions, and receives the at least one second user operation in response to an operation of arranging the one or more height indication sections to correspond to any of the portions,
    wherein the programming board further comprises:
        a parameter value reception section which receives at least one third user operation for indicating a parameter value for defining a state of the control target section in association with a portion of any of the two or more portions; and
        a function reception section which receives at least one fourth user operation for setting a function to be executed by the control target section in association with any of the portions;
    wherein the programming device further comprises:
        one or more parameter value indication sections each of which indicates a parameter value that defines the state of the control target section; and
        one or more function setting sections each of which indicates a function that is performed by the control target section,
    wherein the parameter value reception section is provided on any of the portions, and receives the at least one third user operation in response to an operation of arranging the one or more parameter value indication sections to correspond to any of the portions, and
    wherein the function reception section is provided on any of the portions, and receives the at least one fourth user operation in response to an operation of arranging the one or more function setting sections to correspond to any of the portions.

2. The programming device according to claim 1, wherein the hardware processor moves the control target section along a route corresponding to the planar shape indicated by the planar shape indicating section or along a route corresponding to a three-dimensional shape whose shape projected onto the plane in the direction intersecting with the plane is equal to the planar shape, and generates a command list by which a state of the control target section is changed based on the parameter value when the control target section is at a position corresponding to any of the portions on the route.

3. The programming device according to claim 1, wherein the hardware processor generates a command list by which the control target section performs the function when the control target section is at a position corresponding to any of the portions.

4. The programming device according to claim 1, further comprising:
    the control target section which is moved corresponding to the three-dimensional shape.

5. The programming device according to claim 1, wherein the one or more height indication sections are structured to be stackable on top of each other in the intersecting direction, and
    wherein the height is further specified based on a number of the one or more height indication sections stacked on top of each other in the intersecting direction and arranged to correspond to said any of the portions on the programming board.

6. A programming method that is executed by a programming device including (i) a programming board which is a tangible object that can be directly and physically touched in real space, and which includes (a) a planar shape indication section, (b) a height reception section, (c) a parameter value reception section, and (d) a function reception section, (ii) one or more height indication sections each of which is a tangible object that can be directly and physically touched in real space and is configured to be stacked on the programming board by a user and detected by the programming board when stacked thereon, (iii) one or more parameter value indication sections, (iv) one or more function setting sections, and (v) a hardware processor, the method comprising:
    receiving, by the planar shape indication section of the programming device, at least one first user operation for indicating a planar shape by specifying two or more portions among a plurality of portions arranged at different positions in a planar direction of the planar shape indication section;
    receiving, by the height reception section of the programming device, at least one second user operation for indicating a height that is a position in a direction intersecting with a plane of the planar shape or a displacement amount of the height in association with a portion of any of the two or more portions; and
    generating, by the hardware processor of the programming device, a command list for moving a control target section along a three-dimensional shape indicated by the planar shape indication section and the height reception section,
    wherein each of the one or more height indication sections indicates a height in the intersecting direction or a displacement amount of the height,
    wherein the height reception section is provided on any of the portions,
    wherein said receiving by the height reception section comprises receiving the at least one second user operation in response to an operation of arranging the one or more height indication sections to correspond to any of the portions, wherein the method further comprises:
receiving, by the parameter value reception section of the programming device, at least one third user operation for indicating a parameter value for defining a state of the control target section in association with a portion of any of the two or more portions, and
receiving, by the function reception section of the programming device, at least one fourth user operation for setting a function to be executed by the control target section in association with any of the portions, wherein each of the one or more parameter value indication sections indicates a parameter value that defines the state of the control target section, wherein each of the one or more function setting sections indicates a function that is performed by the control target section, wherein the parameter value reception section is provided on any of the portions, and said receiving by the parameter value reception comprises receiving the at least one third user operation in response to an operation of arranging the one or more parameter value indication sections to correspond to any of the portions, and wherein the function reception section is provided on any of the portions, and said receiving by the function reception section comprises receiving the at least one fourth user operation in response to an operation of arranging the one or more function setting sections to correspond to any of the portions.

7. The programming method according to claim 6,
wherein the one or more height indication sections are structured to be stackable on top of each other in the intersecting direction, and
wherein, in said receiving by the height reception section, the height is further specified based on a number of the one or more height indication sections stacked on top of each other in the intersecting direction and arranged to correspond to said any of the portions on the programming board.

8. A non-transitory computer-readable storage medium having a program stored thereon that is executable by a computer of a programming device including (i) a programming board which is a tangible object that can be directly and physically touched in real space, and which includes (a) a planar shape indication section, (b) a height reception section, (c) a parameter value reception section, and (d) a function reception section, (ii) one or more height indication sections each of which is a tangible object that can be directly and physically touched in real space and is configured to be stacked on the programming board by a user and detected by the programming board when stacked thereon, (iii) one or more parameter value indication sections, and (iv) one or more function setting sections, the program being executable by the computer to cause the computer to actualize functions comprising:
causing the planar shape indication section of the programming device to receive at least one first user operation for indicating a planar shape by specifying two or more portions among a plurality of portions arranged at different positions in a planar direction of the planar shape indication section;
causing the height reception section of the programming device to receive at least one second user operation for indicating a height that is a position in a direction intersecting with a plane of the planar shape or a displacement amount of the height in association with a portion of any of the two or more portions; and
generating a command list for moving a control target section along a three-dimensional shape indicated by the planar shape indication section and the height reception section, wherein each of the one or more height indication sections indicates a height in the intersecting direction or a displacement amount of the height, wherein the height reception section is provided on any of the portions, wherein said causing the height reception section to receive at least one second user operation comprises causing the height reception to receive the at least one second user operation in response to an operation of arranging the one or more height indication sections to correspond to any of the portions, wherein the program is executable by the computer to cause the computer to actualize further functions comprising:
causing the parameter value reception section of the programming device to receive at least one third user operation for indicating a parameter value for defining a state of the control target section in association with a portion of any of the two or more portions, and
causing the function reception section of the programming device to receive at least one fourth user operation for setting a function to be executed by the control target section in association with any of the portions, wherein each of the one or more parameter value indication sections indicates a parameter value that defines the state of the control target section;

wherein each of the one or more function setting sections indicates a function that is performed by the control target section;

wherein the parameter value reception section is provided on any of the portions, and said causing the parameter value reception to receive the at least one third user operation comprises causing the parameter value reception section to receive the at least one third user operation in response to an operation of arranging the one or more parameter value indication sections to correspond to any of the portions; and wherein the function reception section is provided on any of the portions, and said causing the function reception section to receive the at least one fourth user operation comprises causing the function reception section to receive the at least one fourth user operation in response to an operation of arranging the one or more function setting sections to correspond to any of the portions.

9. The programming method according to claim 8,
wherein the one or more height indication sections are structured to be stackable on top of each other in the intersecting direction, and
wherein, in said causing the height reception section to receive at least one second user operation, the height is further specified based on a number of the one or more height indication sections stacked on top of each other in the intersecting direction and arranged to correspond to said any of the portions on the programming board.

* * * * *

UNITED STATES PATENT AND TRADEMARK OFFICE
CERTIFICATE OF CORRECTION

PATENT NO. : 11,113,036 B2
APPLICATION NO. : 16/499229
DATED : September 7, 2021
INVENTOR(S) : Tomoaki Nagasaka et al.

It is certified that error appears in the above-identified patent and that said Letters Patent is hereby corrected as shown below:

On the Title Page

Item (56), Line 1 under "OTHER PUBLICATIONS," delete "Simulatio" and insert --Simulation--.

In the Claims

Claim 8, at Column 46, Line 18, after "height reception" insert --section--.

Claim 9, at Column 46, Line 56, delete "programming method" and insert --non-transitory computer-readable storage medium--.

Signed and Sealed this
Third Day of May, 2022

Katherine Kelly Vidal
*Director of the United States Patent and Trademark Office*